(12) United States Patent
Shirai et al.

(10) Patent No.: US 8,941,841 B2
(45) Date of Patent: Jan. 27, 2015

(54) DISPLACEMENT MEASUREMENT DEVICE, DISPLACEMENT MEASUREMENT METHOD, AND DISPLACEMENT MEASUREMENT PROGRAM

(71) Applicant: Fujitsu Limited, Kawasaki-shi, Kanagawa (JP)

(72) Inventors: Katsuki Shirai, Yokohama (JP); Taizan Kobayashi, Kawasaki (JP); Kouji Uesaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 177 days.

(21) Appl. No.: 13/849,657

(22) Filed: Mar. 25, 2013

(65) Prior Publication Data

US 2013/0271773 A1    Oct. 17, 2013

(30) Foreign Application Priority Data

Apr. 16, 2012 (JP) .................. 2012-092979

(51) Int. Cl.
*G01B 9/02* (2006.01)
*G01D 5/347* (2006.01)
*G01D 5/38* (2006.01)

(52) U.S. Cl.
CPC ........ *G01B 9/02083* (2013.01); *G01D 5/34746* (2013.01); *G01D 5/38* (2013.01)
USPC ...................................... 356/498

(58) Field of Classification Search
CPC ........... G01B 9/02083; G01B 9/02098; G01D 5/347; G01D 5/34746
USPC .......................................... 356/498, 499, 521
See application file for complete search history.

(56) References Cited

U.S. PATENT DOCUMENTS

| | | | |
|---|---|---|---|
| 5,000,572 A | | 3/1991 | Nose et al. |
| 5,750,984 A | * | 5/1998 | Ieki ................. 250/231.16 |
| 2012/0018626 A1 | * | 1/2012 | Nagura ................. 250/232 |

FOREIGN PATENT DOCUMENTS

| | | |
|---|---|---|
| JP | 63-277926 | 11/1988 |
| JP | 2011-75581 | 4/2011 |

* cited by examiner

*Primary Examiner* — Jonathan Hansen
(74) *Attorney, Agent, or Firm* — Staas & Halsey LLP

(57) ABSTRACT

A displacement measurement device includes a plurality of light receiving elements each of which outputs a signal corresponding to illuminance of interference fringe, the elements being arranged in a range of two periods of the interference fringe and arranged with an interval based on the period of the interference fringe in a movement direction of the interference fringe, a differential processing unit configured to perform differential processing on predetermined combinations of the signals output from the elements to generate four signals, a phase calculation unit configured to calculate a phase of the interference fringe on the basis of the signals output from the elements; and an output signal selection unit configured to select two signals from among the four signals on the basis of the phase of the interference fringe and select a signal of which absolute value is larger from among the two selected signals.

7 Claims, 20 Drawing Sheets

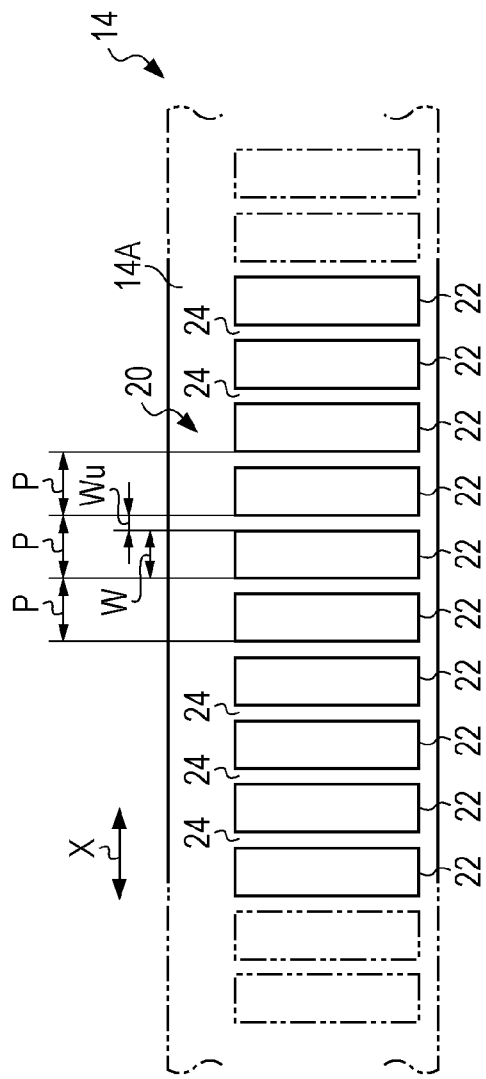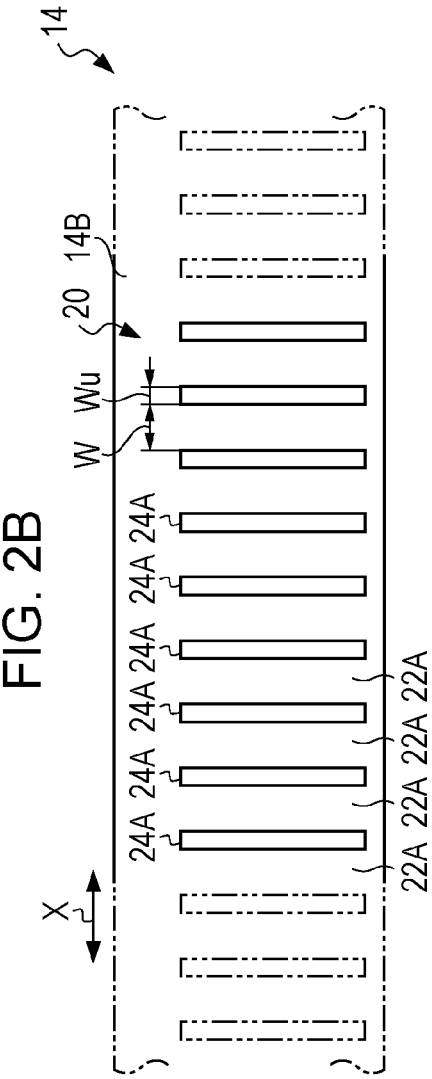

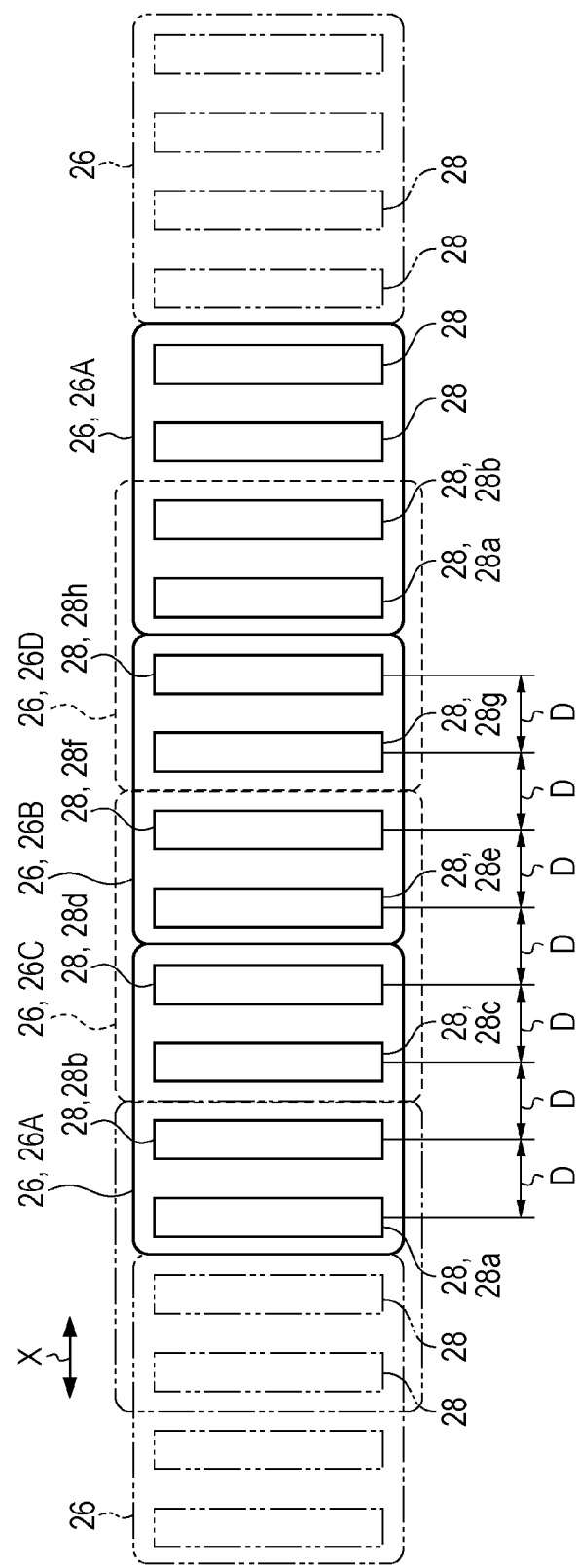

FIG. 8

| SUBTRACTOR | INPUT SIGNAL | PROCESSING | OUTPUT SIGNAL |
|---|---|---|---|
| A | a, c | a − c | sinA |
| B | e, g | e − g | sinB |
| C | c, e | −1·(c − e) | sinC |
| D | g, a | −1·(g − a) | sinD |
| E | b, d | b − d | cosA |
| F | f, h | f − h | cosB |
| G | d, f | −1·(d − f) | cosC |
| H | h, b | −1·(h − b) | cosD |

FIG. 10

| OUTPUT | | PHASE INFORMATION θ | | | |
|---|---|---|---|---|---|
| | | 0° ≦ θ ≦ 90° | 90° ≦ θ ≦ 180° | 180° ≦ θ ≦ 270° | 270° ≦ θ ≦ 0° |
| | Sin WAVEFORM | sinC, sinD | sinA, sinB | sinA, sinB | sinC, sinD |
| | Cos WAVEFORM | cosA, cosB | cosA, cosB | cosC, cosD | cosC, cosD |

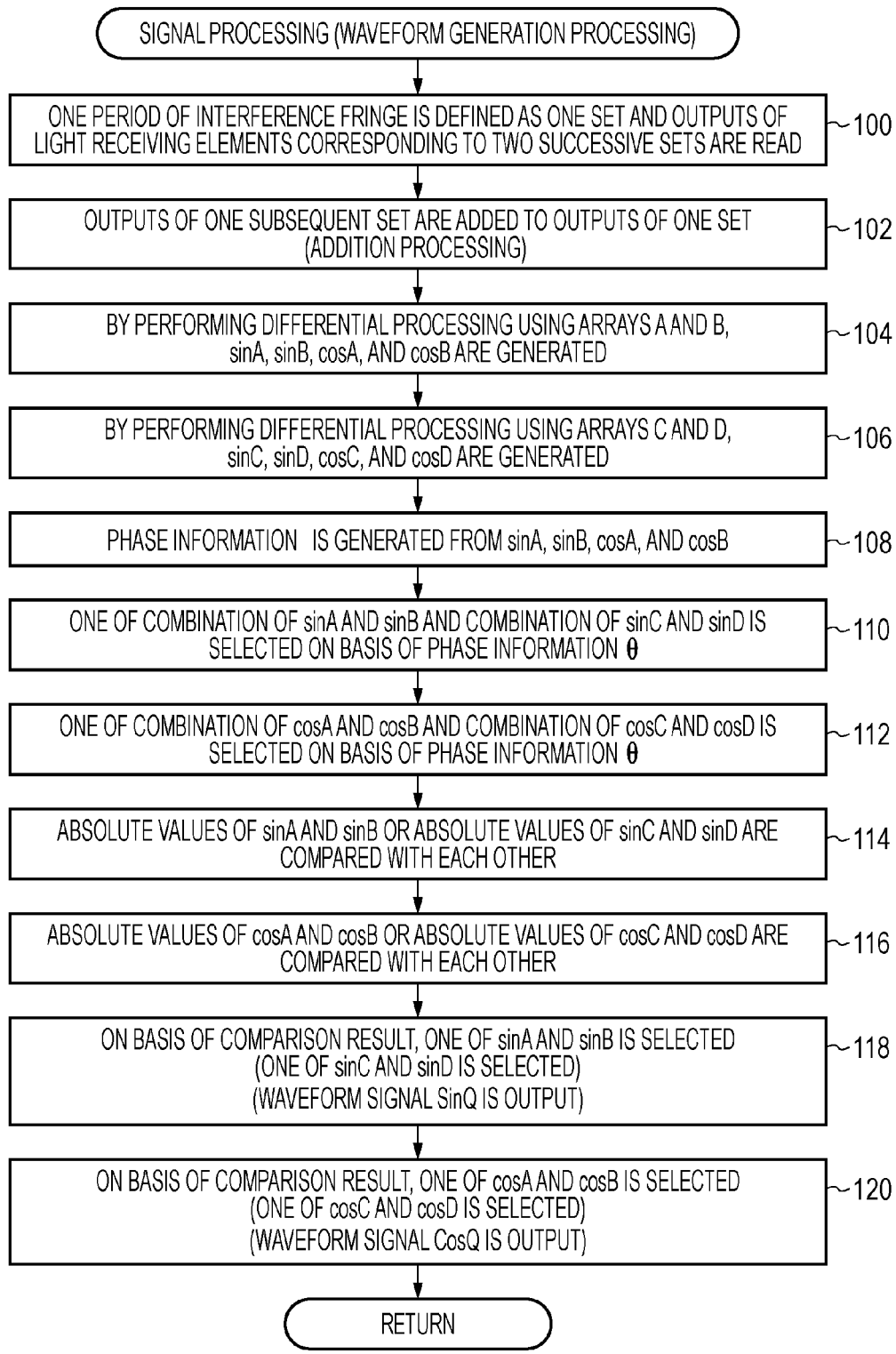

LIGHT RECEIVING ELEMENT a

LIGHT RECEIVING ELEMENT e

LIGHT RECEIVING ELEMENT b

LIGHT RECEIVING ELEMENT f

LIGHT RECEIVING ELEMENT c

LIGHT RECEIVING ELEMENT g

LIGHT RECEIVING ELEMENT d

LIGHT RECEIVING ELEMENT h

ADDER A

ADDER E

ADDER B

ADDER F

ADDER C

ADDER G

ADDER D

ADDER H

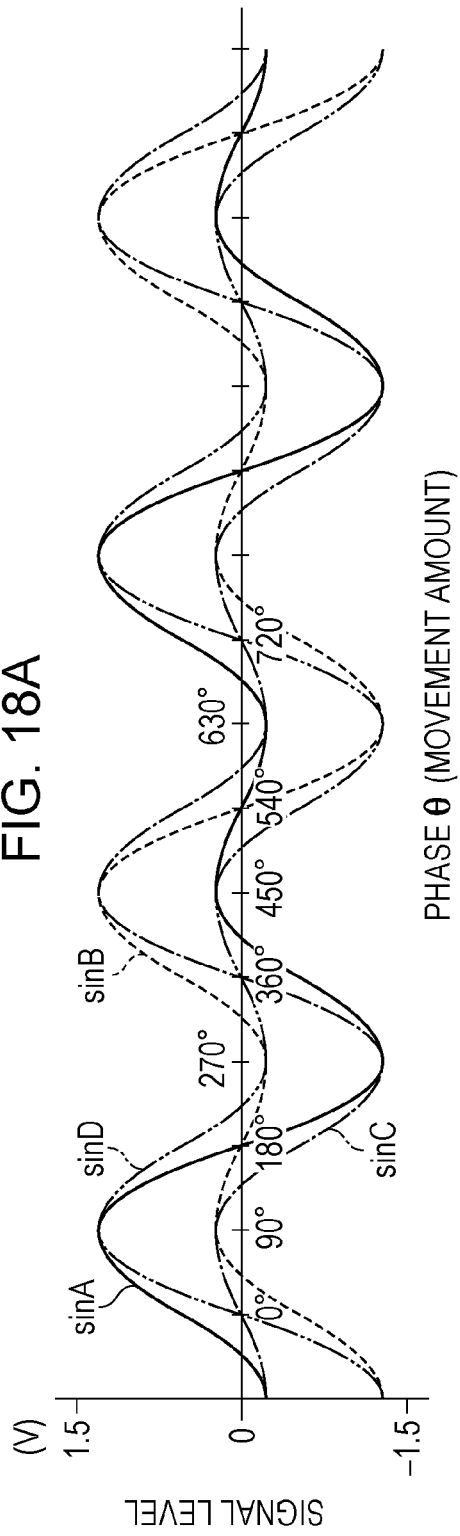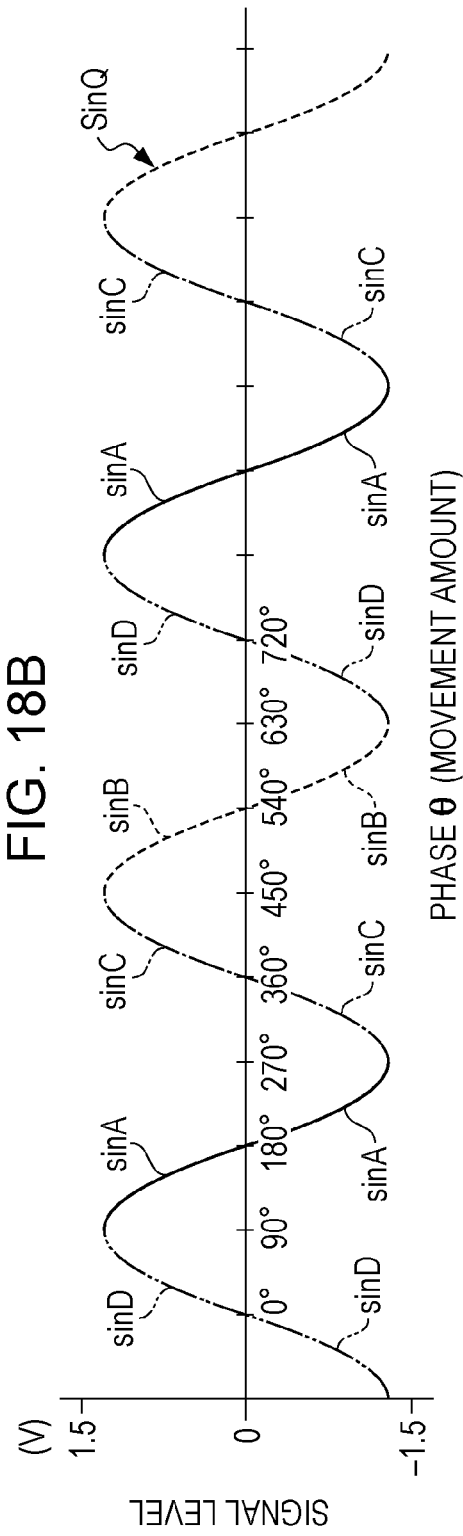

DISPLACEMENT MEASUREMENT DEVICE, DISPLACEMENT MEASUREMENT METHOD, AND DISPLACEMENT MEASUREMENT PROGRAM

CROSS-REFERENCE TO RELATED APPLICATION

This application is based upon and claims the benefit of priority of the prior Japanese Patent Application No. 2012-092979, filed on Apr. 16, 2012, the entire contents of which are incorporated herein by reference.

FIELD

The embodiments discussed herein are related to a displacement measurement device, a displacement measurement method, and a displacement measurement program.

BACKGROUND

As a technique utilizing a photoelectric encoder, a technique has existed where the movement distance or the like of a target object is measured by measuring the displacement of an interference fringe. In a measurement device utilizing this technique, pulses are counted that a light detection sensor outputs in response to a light-dark change occurring when the interference fringe moves, and hence, the displacement amount of the interference fringe is determined. In addition, on the basis of the displacement amount of the interference fringe and a distance per one period, the movement distance of the target object is obtained.

In addition, as the photoelectric encoder, there is a photoelectric encoder that generates two pseudo-sinusoidal waveforms (hereinafter, it is assumed that the pseudo-sinusoidal waveforms are a sine waveform and a cosine waveform) that are out of phase with each other by 90 degrees, from an electrical signal the light detection sensor outputs in response to the movement of an interference fringe. In this photoelectric encoder, from changes in the phases of the sine waveform and the cosine waveform that change in response to the movement of the interference fringe, the movement amount of the interference fringe is measured.

Incidentally, as for the interference fringe, in some cases, a fringe of a high degree is formed along with a fringe of a desired degree. The interference fringe of a high degree deteriorates the S/N ratio of a signal which the light detection sensor outputs, and deforms the sine waveform and the cosine waveform. Accordingly, the measurement accuracy of the displacement amount is deteriorated. A technique of the related art is disclosed in Japanese Laid-open Patent Publication No. 63-277926 or Japanese Laid-open Patent Publication No. 2011-75581.

It is desired that technology is to improve the measurement accuracy of a displacement without resulting in worsening of an S/N ratio.

SUMMARY

According to an aspect of the invention, a displacement measurement device includes a light receiving unit including a plurality of light receiving elements each of which outputs a signal corresponding to illuminance of interference fringe, the plurality of light receiving elements being arranged in a range of two periods of the interference fringe and being arranged with an interval based on the period of the interference fringe in a movement direction of the interference fringe, a degree of the interference fringe being a second degree or higher, the interference fringe being so that illuminance of a bright portion of the interference fringe switches alternately and formation position of the interference fringe moves in response to a displacement, a differential processing unit configured to perform differential processing on predetermined combinations of the signals output from the plurality of light receiving elements to generate four signals, phases or waveforms of the four signals being different from one another, a phase calculation unit configured to calculate a phase of the interference fringe on the basis of the signals output from the plurality of light receiving elements, and an output signal selection unit configured to select two signals from among the four signals on the basis of the phase of the interference fringe and select, as an output signal corresponding to the displacement, a signal of which absolute value is larger from among the two selected signals.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 2A and 2B are plan views of main parts illustrating an example of a diffraction grating;

FIG. 3 is a plan view of a main part of a light receiving unit illustrating an array of light receiving elements;

FIG. 8 is a diagram illustrating setting of an output signal with respect to an input signal in each subtractor;

FIG. 10 is a diagram illustrating a combination of signals selected in response to phase information;

FIG. 12 is a flowchart illustrating an example of signal processing in an encoder;

FIG. 15A illustrates a signal sin A, FIG. 15B illustrates a signal sin B, FIG. 15C illustrates a signal sin C, and FIG. 15D illustrates a signal sin D;

FIG. 16A illustrates a signal cos A, FIG. 16B illustrates a signal cos B, FIG. 16C illustrates a signal cos C, and FIG. 16D illustrates a signal cos D;

FIG. 18A is a diagrammatic view illustrating examples of changes in signal levels of signals sin A, sin B, sin C, and sin D corresponding to a phase of an interference fringe, and FIG. 18B is a diagrammatic view illustrating an example of a waveform signal obtained from FIG. 18A;

DESCRIPTION OF EMBODIMENTS

[Comparative Example]

Hereinafter, a comparative example of the disclosed technology will be described before the description of embodiments of the disclosed technology.

In a photoelectric encoder, light is radiated from a light source to a scale where a diffraction grating is formed with a pitch preliminarily set, the light reflected from the diffraction grating is radiated to a sensor array where a plurality of light receiving elements are arranged, and an interference fringe is formed on the sensor array. In the sensor array, four light receiving elements are arranged on the basis of the period of the interference fringe. For example, when it is assumed that one period ranges from a bright portion of the interference fringe to a subsequent bright portion through a dark portion, the light receiving elements on the sensor array are disposed at intervals causing phases to be 0 degrees, 90 degrees, 180 degrees, and 270 degrees with respect to one period of the interference fringe, and output electrical signals corresponding to illuminance.

In the photoelectric encoder, the scale moves relative to the sensor array, and hence, the formation position of the interference fringe moves. Accordingly, a change in the illuminance according to the movement of the formation position of the interference fringe is converted into an electrical signal, and the movement direction and the movement amount of the scale is measured from this electrical signal.

Figure 20:
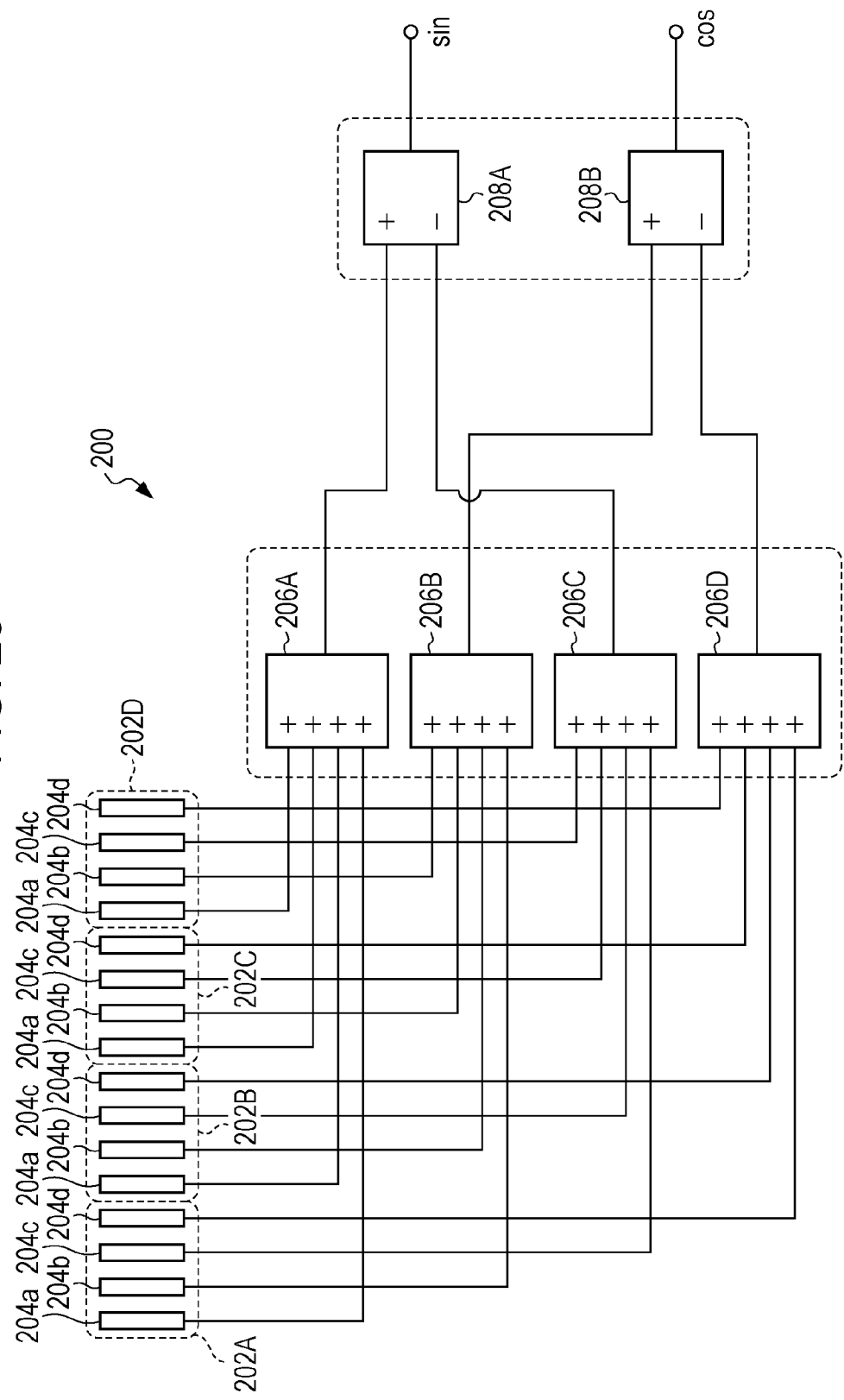
FIG. 20 is a functional block diagram illustrating an example of signal processing in a comparative example.

FIG. 20 illustrates an example of a photoelectric encoder according to the present comparative example. In this photoelectric encoder 200, a plurality of sensor arrays 202A, 202B, 202C, and 202D are disposed in the movement direction of the interference fringe. Each of the sensor arrays 202A to 202D includes four light receiving elements 204a, 204b, 204c, and 204d with intervals tailored to phases in the interference fringe, and the light receiving elements 204a to 204d output electrical signals according to illuminance changing owing to the movement of the interference fringe.

The photoelectric encoder 200 includes adders 206A, 206B, 206C, and 206D. The outputs of the individual light receiving elements 204a in the sensor arrays 202A to 202D are input to the adder 206A, and the outputs of the individual light receiving elements 204b are input to the adder 206B. In addition, in the photoelectric encoder 200, the outputs of the individual light receiving element 204c in the sensor arrays 202A to 202D are input to the adder 206C, and the outputs of the individual light receiving elements 204d are input to the adder 206D. In the photoelectric encoder 200, the adders 206A to 206D add and output the input signals.

In addition, the photoelectric encoder 200 includes subtractors 208A and 208B. The output signal of the adder 206A and the output signal of the adder 206C are input to the subtractor 208A. By performing subtraction processing where the output signal of the adder 206C is subtracted from the output signal of the adder 206A, the subtractor 208A outputs a signal whose waveform (hereinafter, defined as a sine waveform) corresponds to the movement of the interference fringe. The output signal of the adder 206B and the output signal of the adder 206D are input to the subtractor 208B. By performing subtraction processing where the output signal of the adder 206D is subtracted from the output signal of the adder 206B, the subtractor 208B outputs a signal whose waveform (hereinafter, defined as a cosine waveform) corresponds to the movement of the interference fringe.

On the basis of the signal of the sine waveform and the signal of the cosine waveform, the photoelectric encoder 200 calculates the movement direction and the movement amount of the interference fringe. This movement direction of the interference fringe corresponds to the relative movement direction of the scale formed in the diffraction grating, and the movement amount of the formation position of the interference fringe corresponds to the relative movement amount of the scale.

Incidentally, in the photoelectric encoder, a resolution capability is determined by a scale pitch serving as a reflection portion pitch formed in the diffraction grating. In addition, in the photoelectric encoder, usually the duty ratio of the width of the reflection surface is set to 50% with respect to the scale pitch.

Accordingly, in the photoelectric encoder, if the scale pitch is made narrow, it may be possible to improve the resolution capability. In addition, as a method for improving the resolution capability in the photoelectric encoder, there is also a method where the period of the interference fringe is shortened by forming an interference fringe of a second degree or higher.

When the scale pitch is made narrow or when the interference fringe of a second degree or higher is formed, the width of the reflection portion of light in the diffraction grating becomes narrow. Therefore, on the sensor array, the illuminance of the bright portion of the interference fringe is reduced. This reduction of the illuminance reduces a signal output from the light receiving element, and causes the deterioration of the S/N ratio of the signal output from the light receiving element to occur.

For example, when a Lissajous circle is formed on the basis of the sine waveform and the cosine waveform, the reduction of the signal level causes the Lissajous circle to be small, and the deterioration of the S/N ratio deforms the shape of the Lissajous circle.

If the light emitted from the light source is strengthened, it may be possible to avoid the reduction of the illuminance due to the interference fringe. However, this case results in the occurrence of an increase in the heat generation of a light emitting element provided in the light source or a short lifespan.

In addition, if the duty ratio of the reflection portion formed in the diffraction grating is made high, it may be possible to avoid the reduction of the illuminance. However, if the duty ratio of the reflection portion is made high, the illuminance of the bright portion is reduced every one period of the interference fringe, and it may become difficult to generate the sine waveform and the cosine waveform. In this case, in the photoelectric encoder 200 illustrated in FIG. 20, by overlapping the signal of a region whose brightness is low and the signal of a region whose brightness is high on each other using the light receiving elements 204 corresponding to two periods of the interference fringe, it may be possible to achieve averaging of the illuminance of brightness.

However, if the signals of the plural light receiving elements are added, noise components contained in the individual signals are also superimposed. Therefore, the deterioration of the S/N ratio may occur in the signals of the sine waveform and the cosine waveform.

[Embodiment]

Next, an example of an embodiment of the disclosed technology will be described in detail with reference to drawings.

Figure 1:
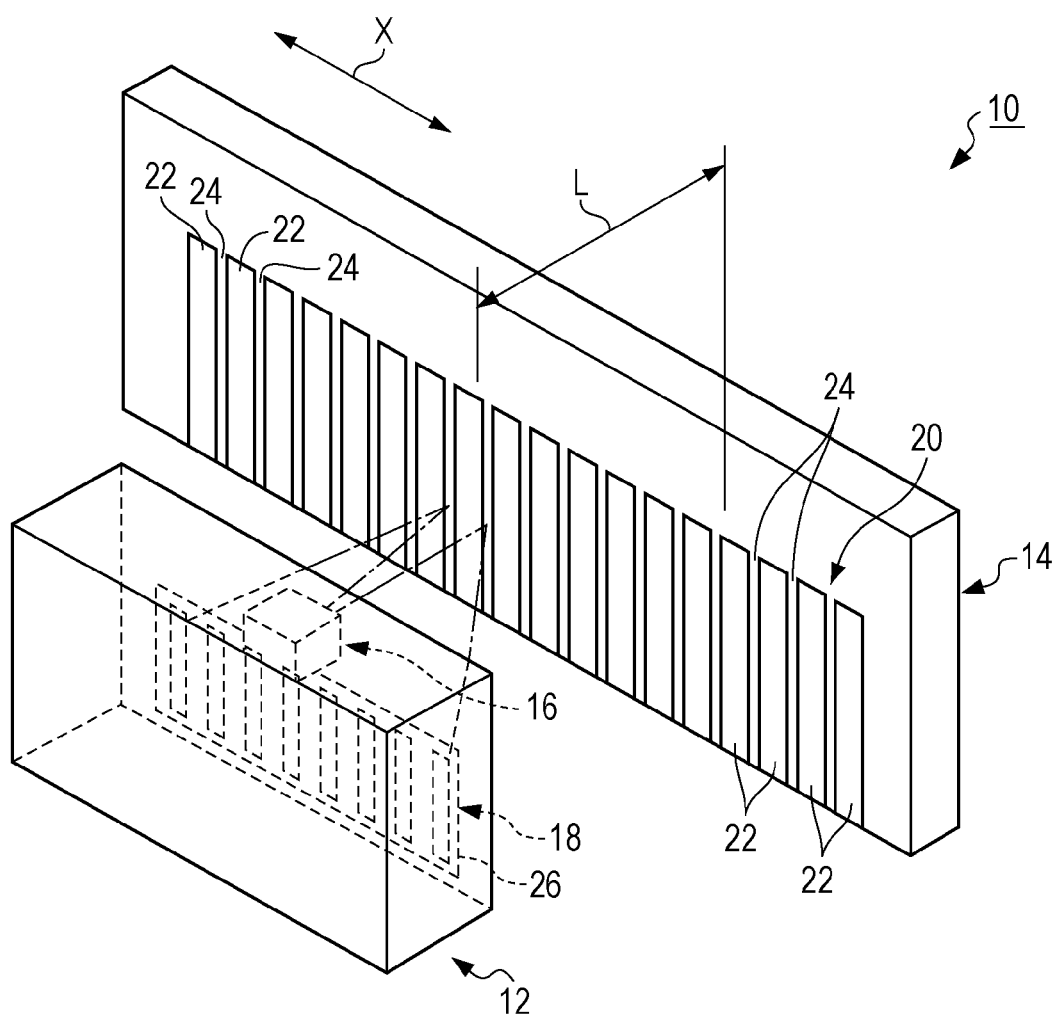
FIG. 1 is a perspective view of a main part of a photoelectric encoder according to the present embodiment.

In FIG. 1, the perspective view of the main part of a photoelectric encoder (hereinafter, defined as an encoder 10) according to the present embodiment is illustrated. In addition, the encoder 10 is an example of a displacement measurement device according to the disclosed technology. The encoder 10 includes an encoder head 12 and a scale unit 14. In the encoder 10, the encoder head 12 and the scale unit 14 face each other. In addition, in the encoder 10, the scale unit 14 moves relative to the encoder head 12. In addition, in FIG. 1, an example of a relative movement direction is indicated by an arrow X.

In a surface facing the scale unit 14, the encoder head 12 includes a light source unit 16 and a light receiving unit 18. Using, for example, a vertical cavity surface emitting laser (VCSEL) or the like, the light source unit 16 radiates light having a preliminarily set wave length to the scale unit 14.

The scale unit 14 includes a diffraction grating 20. The diffraction grating 20 is formed in a surface in the scale unit 14, which faces the encoder head 12, and reflects the light radiated from the light source unit 16 in the encoder head 12, to the light receiving unit 18 in the encoder head 12. In the encoder 10, owing to the reflected light from the diffraction grating 20, an interference fringe is formed on the light receiving unit 18. In addition, in the encoder 10, the scale unit 14 relatively moves, and hence, the formation position of the interference fringe on the light receiving unit 18 moves.

In the disclosed technology, the light source unit 16 is not limited to the VCSEL, and may also adopt any configuration where a predetermined interference fringe is formed in the light receiving unit 18. In addition, the diffraction grating 20 is not limited to a form reflecting light, and a slit causing light to pass therethrough may also be formed and the interference fringe may also be formed owing to the light passing through the slit.

As illustrated in FIG. 2A, the diffraction grating 20 in the scale unit 14 is formed owing to a plurality of reflection portions 22, disposed in the relative movement direction with a predetermined scale pitch P, and non-reflection portions 24 disposed between the reflection portions 22. The width in the relative movement direction (the arrow X direction in FIG. 2A) of the reflection portion 22 is set to W, and the reflection portion 22 reflects the light radiated from the light source unit 16, to the light receiving unit 18 in the encoder head 12. In addition, the width in the relative movement direction of the non-reflection portion 24 is set to Wu, and the reflection of the light to the encoder head 14 is suppressed.

As illustrated in FIG. 2A, such a diffraction grating 20 may also be configured by the reflection portion 22 being formed in a base 14A of the scale unit 14. In addition, as illustrated in FIG. 2B, the diffraction grating 20 may also be configured by the non-reflection portion 24 being formed with the scale pitch P in a base 14B on which a surface reflecting the light is formed.

As illustrated in FIG. 1, the encoder 10 includes a sensor array 26 provided in the light receiving unit 18 in the encoder head 12. FIG. 3 illustrates the sensor array 26 provided in the light receiving unit 18. In the light receiving unit 18, a plurality of the sensor arrays 26 are arranged in the relative movement direction (the arrow X direction in FIG. 3) of the scale unit 14. This relative movement direction of the scale unit 14 turns out to be the movement direction of the formation position of the interference fringe on the light receiving unit 18.

In each sensor array 26, four light receiving elements 28 are arranged in the relative movement direction with a predetermined sensor pitch D, and the arrangement interval between the light receiving elements 28 adjacent to each other is also the sensor pitch D between the sensor arrays 26 adjacent to each other as illustrated in FIG. 3.

Each light receiving element 28 outputs an electrical signal corresponding to the intensity (also expressed as illuminance) of the irradiated light. At this time, in each light receiving element 28, the illuminance of the irradiated light changes in response to the movement of the formation position of the interference fringe, and hence, the output electrical signal changes.

In the present embodiment, one sensor array 26 is caused to correspond to a movement amount corresponding to one period of the interference fringe when the interference fringe moves in response to the relative movement of the scale unit 14. In addition, when it is assumed that a phase corresponding to the movement amount corresponding to one period of the interference fringe is $2\pi$ (360 degrees), the positions of the light receiving elements 28 in the sensor array 26 turn out to be positions out of phase with each other by $\pi/2$ (90 degrees) (for example, positions corresponding to 0 (0 degrees), $\pi/2$ (90 degrees), $\pi$ (180 degrees), and $3\pi/2$ (270 degrees)).

From the changes of the electrical signals output from the light receiving elements 28 arranged with the above-mentioned phases, the encoder 10 generates waveform signals having two phases out of phase with each other by 90 degrees. In the following description, one of the waveform signals having two phases is expressed as a waveform signal Sin Q, and the other is expressed as a waveform signal Cos Q. In addition, hereinafter, a configuration contributing to the generation of the waveform signal Sin Q is expressed as a sine side, and a configuration contributing to the generation of the waveform signal Cos Q is expressed as a cosine side. One of the waveform signals Sin Q and Cos Q is an example of a first phase in the disclosed technology, and the other is an example of a second phase in the disclosed technology.

From the waveform signal Sin Q and the waveform signal Cos Q, the encoder 10 calculates the movement direction and the movement amount of the formation position of the interference fringe, namely, the relative movement direction and the relative movement amount of the scale unit 14.

In response to a distance L between the diffraction grating 20 in the scale unit 14 and the encoder head 12 (the light receiving unit 18), the wave length $\lambda$ of light, and the scale pitch P of the reflection portion 22 in the diffraction grating 20, the degree of the interference fringe is determined. From a fixed number n according to the degree of the interference fringe, the distance L turns out to satisfy $L=(2 n P^2)/\lambda$.

In this case, a distance (the sensor pitch D) between the light receiving elements 28 disposed with a phase difference of 90 degrees becomes wide in response to the degree of the interference fringe, and hence, the resolution capability of the encoder 10 is reduced. When the degree of the interference fringe is set to m (the m is an integer number greater than or equal to 1) so that the resolution capability of the encoder 10 is not reduced, m P is applied in place of the scale pitch P, a ratio between the width W of the reflection portion 22 and the width Wu of the non-reflection portion 24 is defined on condition that the reflection portion corresponds to 1 and the non-reflection portion corresponds to (2 m−1), and the fixed number n corresponding to the degree is set to n=1/m. The distance L at this time turns out to satisfy $L = 2P^2/m\lambda$.

However, when the ratio between the width W of the reflection portion 22 and the width Wu of the non-reflection portion 24 is set to 1:(2 m−1), the degree m of the interference fringe becomes high, and hence, the width W of the reflection portion 22 becomes narrow. Therefore, the illuminance of the interference fringe is reduced. The reduction of the illuminance emerges as the reduction of a signal level whose light is received in the light receiving element 28, and causes the deterioration of the S/N ratio to occur in the electrical signal output from the light receiving element 28. The reduction of the signal level and the deterioration of the S/N ratio lessen the Lissajous circle formed on the basis of a waveform signal on the sine side and a waveform signal on the cosine side, and deforms the shape of the circle.

While, as a method for avoiding the reduction of the illuminance, a method may be considered where the amount of light the light emitting element provided in the light source unit 16 emits is increased, the increase in the amount of light of the light emitting element causes an increase in the temperature of the light emitting element and the life shortening thereof to occur.

In the present embodiment, a duty ratio Dr serving as the ratio of the width W of the reflection portion 22 to the scale pitch P is set in response to the degree m of the interference fringe. In addition, in the present embodiment, by setting an array pitch Da serving as a distance between the sensor arrays 26 to P=Da with respect to the scale pitch P, the sensor pitch D is set to D=P/4, and the reduction of the resolution capability is suppressed. At this time, in the present embodiment, as for the interference fringe of the second degree or higher, the width W of the reflection portion 22 is widened in response to the degree m (the m is an integer number greater than or equal to 2) of the interference fringe.

In the present embodiment, a ratio between the width W of the reflection portion 22 and the width Wu of the non-reflection portion 24 is defined on the assumption that the reflection portion 22 corresponds to (m−1) when the non-reflection portion 24 corresponds to 1. In addition, in the present embodiment, it is assumed that the fixed number n determined according to the degree m satisfies n=(m−1)/m.

Accordingly, the distance L for forming the interference fringe of the degree m satisfies the following expression.

$$L = (2nP^2)/\lambda$$
$$= 2(m-1)P^2/m\lambda$$

In addition, in the present embodiment, the ratio (duty ratio) Dr of the width W of the reflection portion 22 to the scale pitch P becomes Dr=((m−1)/m)×100 (%). When the interference fringe of the second degree is used, this duty ratio Dr becomes Dr=50%, when the interference fringe of the third degree is used, this duty ratio Dr becomes Dr=60%, when the interference fringe of the fourth degree is used, this duty ratio Dr becomes Dr=75%, and when the interference fringe of the fifth degree is used, this duty ratio Dr becomes Dr=80%. Accordingly, if the scale pitch P is the same, the width W of the reflection portion 22 increases with an increase in the degree of the interference fringe.

In the encoder 10 according to the present embodiment, as an example, the interference fringe of the fourth degree is used, the width W of the reflection portion 22 is set to 75% (Dr=75%) of the scale pitch P, and the width Wu of the non-reflection portion 24 is set to 25% of the scale pitch P. In addition, in the encoder 10 according to the present embodiment, the sensor pitch D and the scale pitch P are set so as to satisfy D=P/4.

Figure 4:
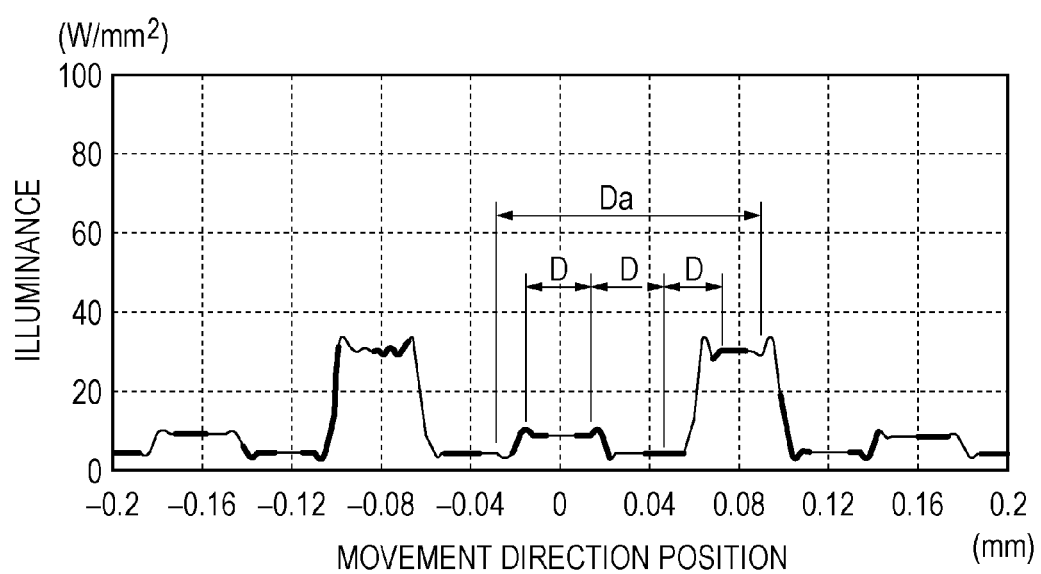
FIG. 4 is a diagrammatic view illustrating illuminance of an interference fringe where a duty ratio of a reflection portion according to the present embodiment is 75%.
Figure 5A:
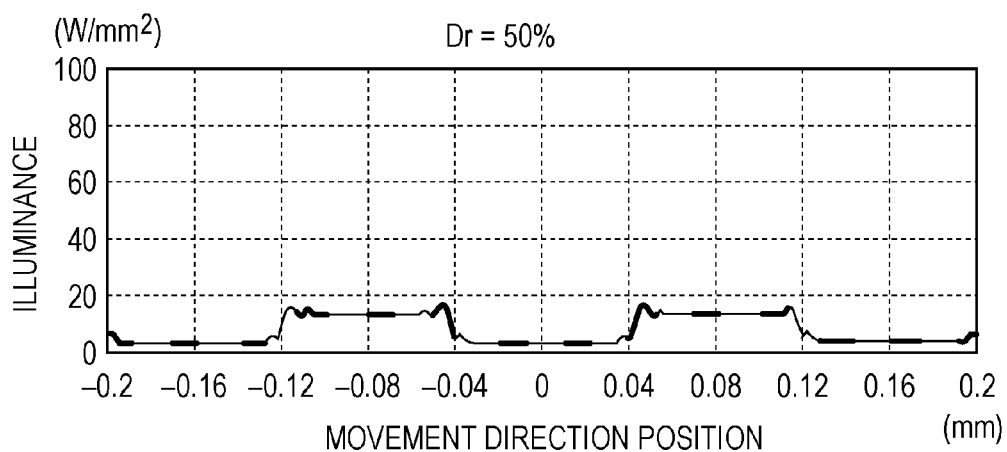
FIGS. 5A and 5B are diagrammatic views illustrating illuminance of an interference fringe corresponding to the duty ratio of the reflection portion where FIG. 5A corresponds to a duty ratio of 50% and FIG. 5B corresponds to a duty ratio of 12.5%.
Figure 5B:
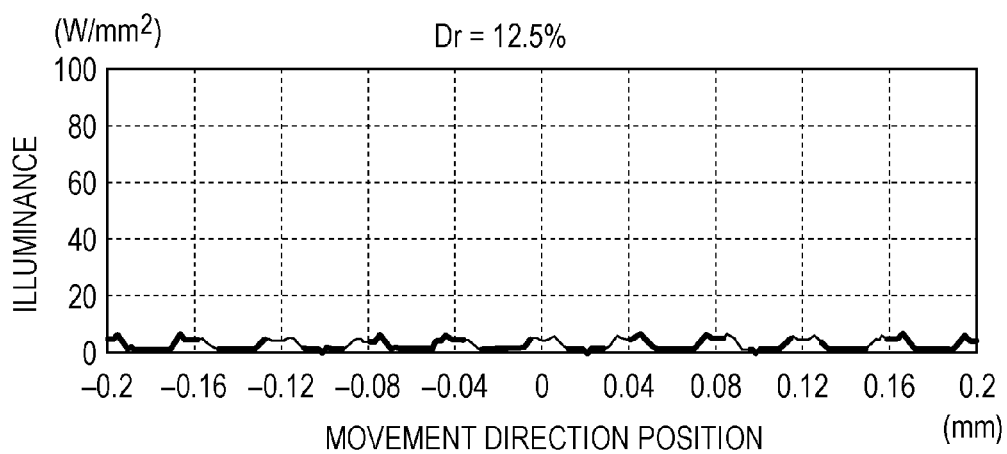

FIG. 4 illustrates an illuminance change due to an interference fringe in the case of the duty ratio Dr=75%. In addition, FIG. 5A illustrates an illuminance change in the case of the duty ratio Dr=50%, and FIG. 5B illustrates an illuminance change in the case of the duty ratio Dr=12.5%. In addition, in FIG. 4, FIG. 5A, and FIG. 5B, a horizontal axis corresponds to a position in the relative movement direction, and the scale pitch P is set to P=0.08 mm, and the sensor pitch D is set to D=0.02 mm. In addition, in FIG. 4, FIG. 5A, and FIG. 5B, an example of the position of the light receiving element 28 is indicated by a thick line on the waveform of illuminance.

As illustrated in FIG. 5B, when the duty ratio Dr is lowered to satisfy the duty ratio Dr=12.5%, the bright portion of the interference fringe emerges with an interval serving as ½ of the scale pitch P, and hence, a signal level the light receiving element 28 corresponding to the bright portion outputs also becomes high. In this regard, however, in the case of the duty ratio Dr=12.5%, the illuminance of the bright portion is low, and an illuminance difference between the bright portion and the dark portion is also small.

As illustrated in FIG. 5A, in the case of the duty ratio Dr=50% commonly used in the photoelectric encoder, compared with the case of the duty ratio Dr=12.5%, the illuminance is high, and an illuminance difference between the bright portion and the dark portion also becomes large.

On the other hand, as illustrated in FIG. 4, in the case of the duty ratio Dr=75%, a region emerges where the illuminance is higher than the case of the duty ratio Dr=50% (refer to FIG. 5A). Accordingly, in the case of the duty ratio=75%, using the output of the light receiving element 28 according to the illuminance corresponding to this bright portion, even if the interference fringe of a higher degree is used, it may be possible to increase the S/N ratio, compared with the case of the duty ratio Dr=50%.

In the present embodiment, so as to obtain high illuminance when the interference fringe of a higher degree is used, the duty ratio Dr is heightened in response to the degree of the interference fringe, and hence, the reduction of the illuminance of the interference fringe is suppressed.

However, in the case of the duty ratio Dr=75%, a bright portion whose illuminance is high and a bright portion whose illuminance is low alternately emerge in the bright portion of the interference fringe. In other words, when the duty ratio Dr is set to a large ratio in response to the degree of the interference fringe, a bright portion whose illuminance is high and a bright portion whose illuminance is low alternately emerge in the interference fringe.

In the present embodiment, when it is assumed that a pair of light and dark in the interference fringe corresponds to one period, the waveform signal Sin Q and the waveform signal Cos Q are obtained from the interference fringe where the illuminance of the bright portion alternately changes. In addition, the present embodiment is not limited to the interference fringe where the illuminance of the bright portion alternately changes, and may also be applied to an interference fringe where the change of the bright portion is small.

In addition, as illustrated in FIG. 5A, in the case of the duty ratio Dr=50% commonly used, one period of the interference fringe becomes 0.16 mm that is twice as large as the scale pitch P. On the other hand, in the case of the duty ratio Dr=75% illustrated in FIG. 4, one period of the interference fringe becomes half the period in the case of the duty ratio Dr=50%.

Accordingly, in the present embodiment, the duty ratio Dr is set to a ratio higher than the duty ratio Dr=50% commonly used, and hence, it may be possible to enhance the resolution capability of the encoder 10.

Figure 6:
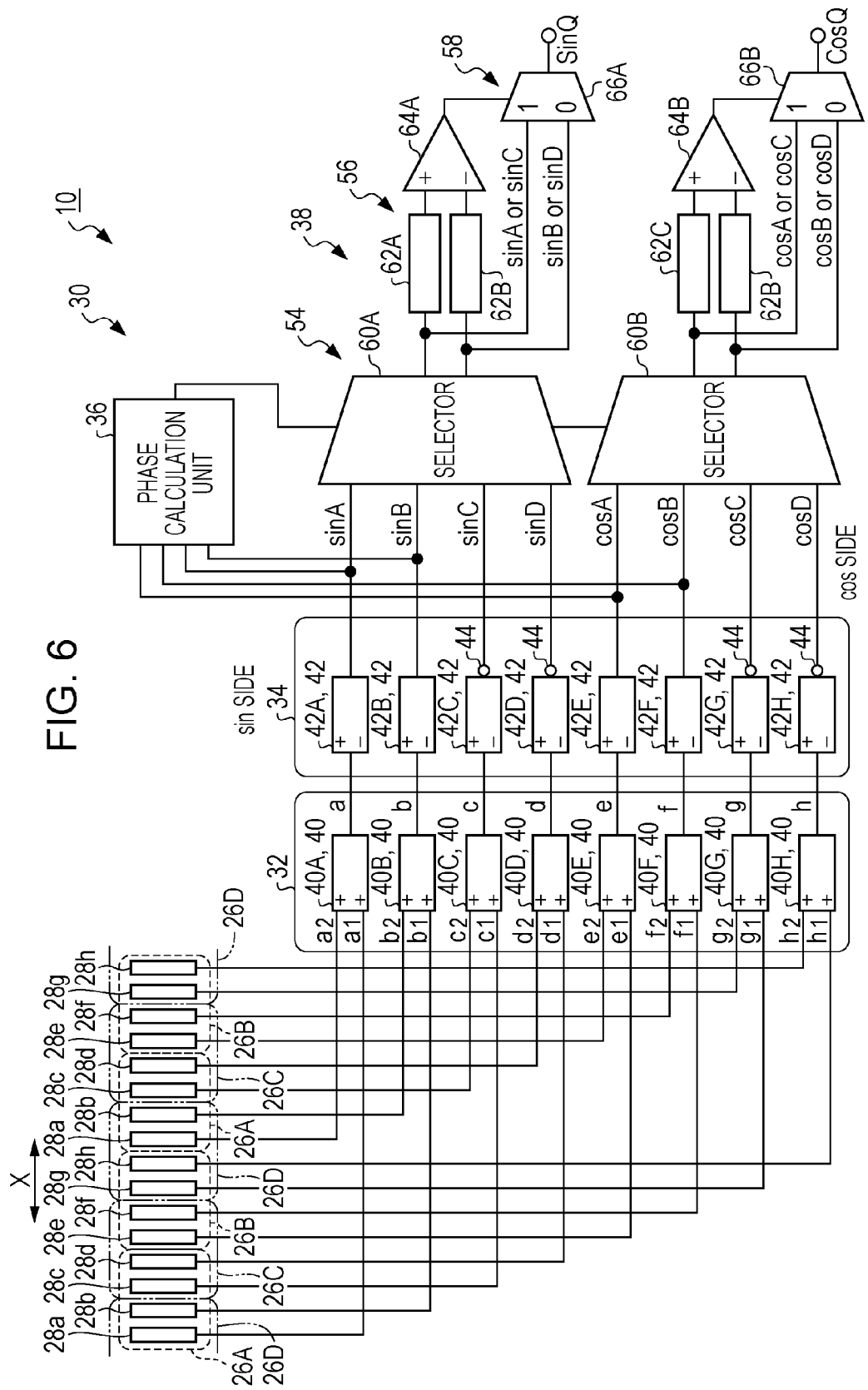
FIG. 6 is a functional block diagram illustrating an example of a signal processing unit.

As illustrated in FIG. 6, the encoder 10 includes a signal processing unit 30 generating the waveform signal Sin Q and the waveform signal Cos Q. The signal processing unit 30 includes an addition processing unit 32, a differential processing unit 34, a phase calculation unit 36, and an output signal selection unit 38.

In the encoder 10, with respect to one sensor array 26, the light receiving elements 28 are arranged with an interval where a phase angle becomes 90 degrees ($\pi/2$) with respect to the relative movement amount corresponding to one period in which the phase angle of the interference fringe becomes 360 degrees ($2\pi$). FIG. 6 illustrates one block used for generating one pair of the waveform signals Sin Q and Cos Q. In the present embodiment, a large number of the sensor arrays 26 are continuously arranged in the relative movement direction, and hence, a large number of pairs of the waveform signals Sin Q and Cos Q are generated.

In the present embodiment, sensor arrays 26A and 26B corresponding to two periods of the interference fringe are defined as one set, and using two sets of the sensor arrays 26A and 26B, one pair of the waveform signal Sin Q and the waveform signal Cos Q are generated. Hereinafter, individual light receiving elements 28 in the sensor array 26A are distinguished with being expressed as light receiving elements 28$a$, 28$b$, 28$c$, and 28$d$, and individual light receiving elements 28 in the sensor array 26B are distinguished with being expressed as light receiving elements 28$e$, 28$f$, 28$g$, and 28$h$.

In the present embodiment, in addition to the sensor arrays 26A and 26B, the light receiving elements 28$c$ and 28$d$ in the sensor array 26A and the light receiving elements 28$e$ and 28$f$ in the sensor array 26B are handled as one sensor array (hereinafter, defined as a sensor array 26C). In addition, in the present embodiment, the light receiving elements 28$g$ and 28$h$ in the sensor array 26B and the light receiving elements 28$a$ and 28$b$ in the sensor array 26A are handled as another sensor array (hereinafter, defined as a sensor array 26D).

In the present embodiment, by providing the sensor arrays 26C and 26D, a signal out of phase with a signal obtained from the sensor arrays 26A and 26B by 180 degrees is obtained. In addition, in the present embodiment, for the sake of simplifying the description, in place of the light receiving elements 28$a$ and 28$b$ in the sensor array 26A, using the light receiving elements 28$a$ and 28$b$ in the sensor array 26A adjacent to the sensor array 26B, the sensor array 26D is formed.

Figure 7:
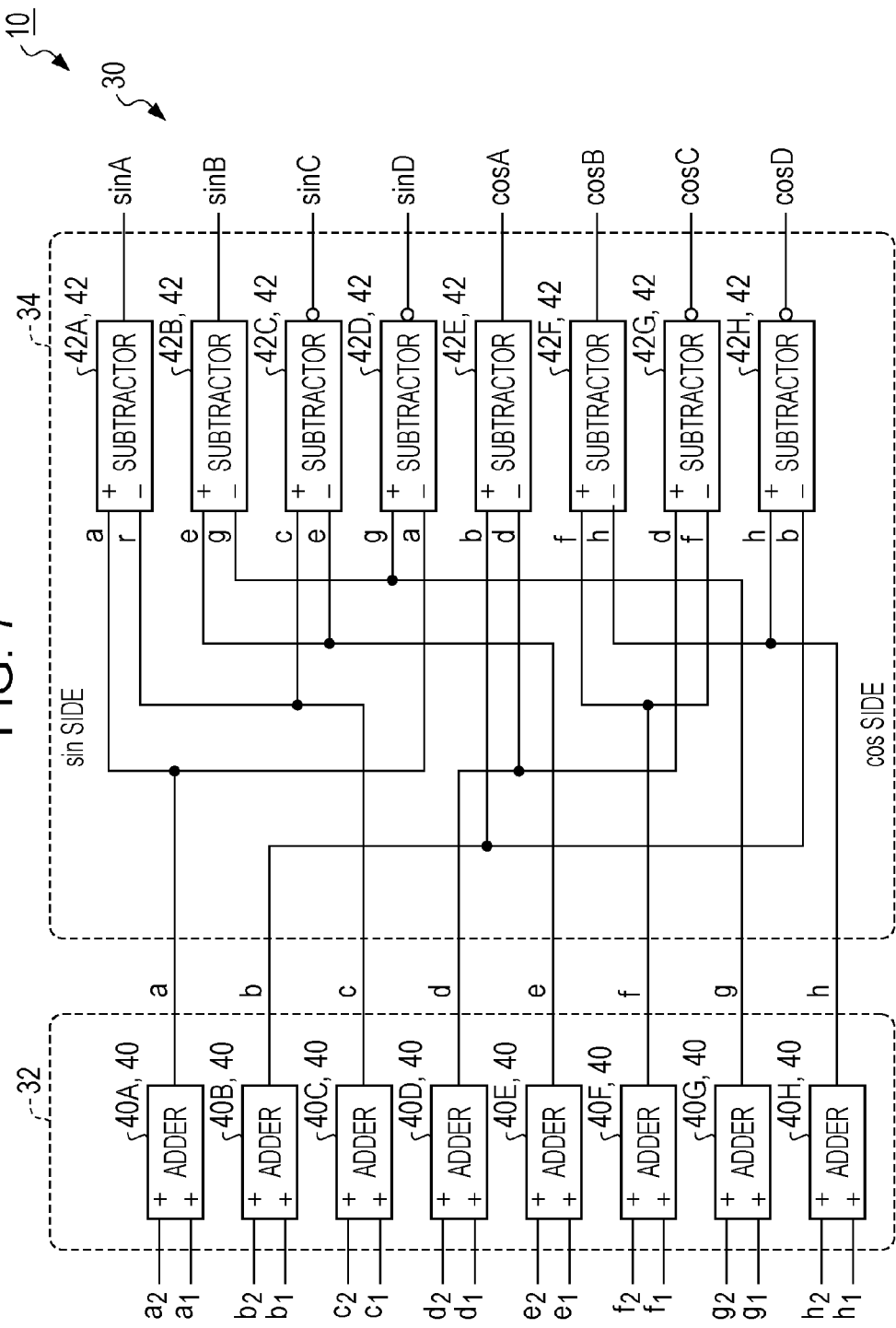
FIG. 7 is a functional block diagram illustrating an example of a differential processing unit.

As illustrated in FIG. 6 and FIG. 7, the addition processing unit 32 includes adders 40 (adders 40A to 40H) corresponding to the light receiving elements 28$a$ to 28$h$, respectively. Signals $a_1$ and $a_2$ corresponding to illuminance are input from the light receiving elements 28$a$ in the two sensor arrays 26A to the adder 40A, and hence, the adder 40A outputs a signal a where the signals $a_1$ and $a_2$ are added. Signals $b_1$ and $b_2$ corresponding to illuminance are input from the light receiving elements 28$b$ in the two sensor arrays 26A to the adder 40B, and hence, the adder 40B outputs a signal b where the signals $b_1$ and $b_2$ are added.

Signals $c_1$ and $c_2$ are input from the light receiving elements 28$c$ in the two sensor arrays 26A to the adder 40A, and hence, the adder 40C outputs a signal c. Signals $d_1$ and $d_2$ are input from the light receiving elements 28$d$ in the two sensor arrays 26A to the adder 40D, and hence, the adder 40D outputs a signal d. Furthermore, signals $e_1$ and $e_2$ are input from the light receiving elements 28$e$ in the two sensor arrays 26B to the adder 40E, and hence, the adder 40E outputs a signal e. In addition, signals $f_1$ and $f_2$ are input from the light receiving elements 28$f$ in the two sensor arrays 26B to the adder 40F, and hence, the adder 40F outputs a signal f. In addition, signals $g_1$ and $g_2$ are input from the light receiving elements 28$g$ in the two sensor arrays 26B to the adder 40G, and hence, the adder 40G outputs a signal g. In addition, signals $h_1$ and $h_2$ are input from the light receiving elements 28$h$ in the two sensor arrays 26B to the adder 40H, and hence, the adder 40H outputs a signal h.

Owing to the adders 40A to 40H, the addition processing unit 32 obtains the signals a to h corresponding to two period of the interference fringe. In addition, the addition processing unit 32 outputs the signals a to h to the differential processing unit 34.

As illustrated in FIG. 6 and FIG. 7, the differential processing unit 34 includes a plurality of subtractors 42. In the present embodiment, as the subtractors 42, subtractors 42A to 42D on the sine side, used for generating the waveform signal Sin Q, and subtractors 42E to 42H on the cosine side, used for generating the waveform signal Cos Q, are provided.

The signals a to h are input to the input subtractors 42A to 42H in preliminarily set combinations. FIG. 8 illustrates the combinations of the signals input to the subtractors 42A to 42H, and signals to be output. In addition, in FIG. 8, the subtractors 42A to 42H are expressed as A to H.

The signals a and c are input to the subtractor 42A, and the signal c is subtracted from the signal a. Accordingly, the subtractor 42A outputs a signal sin A applied for generating the waveform signal Sin Q. The signals e and g are input to the subtractor 42B, and the signal g is subtracted from the signal e. Accordingly, the subtractor 42B outputs a signal sin B.

In addition, the signals b and d are input to the subtractor 42E, and hence, the signal d is subtracted from the signal b. Accordingly, the subtractor 42E outputs a signal cos A applied for generating the waveform signal Cos Q. Furthermore, the signals f and h are input to the subtractor 42F, and hence, the signal h is subtracted from the signal g and the signal cos B is output.

In the differential processing unit 34, each of the subtractors 42C, 42D, 42G, and 42H includes an inverter 44 inverting the sign of a signal. The signals c and e are input to the subtractor 42C, and hence, the signal e is subtracted from the signal c and a signal is output where a subtraction result is inverted. Accordingly, the subtractor 42C outputs a signal sin C applied for generating the waveform signal Sin Q. The signals g and a are input to the subtractor 42D, and hence, the signal a is subtracted from the signal g and a signal sin D is output where a subtraction result is inverted.

In addition, the signals d and f are input to the subtractor 42G, and hence, the signal f is subtracted from the signal d and a signal cos C is output where a subtraction result is inverted. Furthermore, the signals h and b are input to the subtractor 42H, and hence, the signal b is subtracted from the signal h and a signal cos D is output where a subtraction result is inverted.

In the present embodiment, owing to the subtractors 42A, 42B, 42E, and 42F, the signals sin A and sin B and the signals cos A and cos B are output on the basis of electrical signals obtained from the light receiving elements 28a to 28h in the sensor arrays 26A and 26B. In addition, in the present embodiment, owing to the subtractors 42C, 42D, 42G, and 42H, the signals sin C and sin D and the signals cos C and cos D are output on the basis of electrical signals obtained from the light receiving elements 28a to 28h in the sensor arrays 26C and 26D.

In the present embodiment, the sensor arrays 26C and 26D are set with respect to the sensor arrays 26A and 26B, and the signals sin C, sin D, cos C, and cos D are generated whose phases are opposite to the signals sin A, sin B, cos A, and cos B obtained from the sensor arrays 26A and 26B.

Figure 15A:
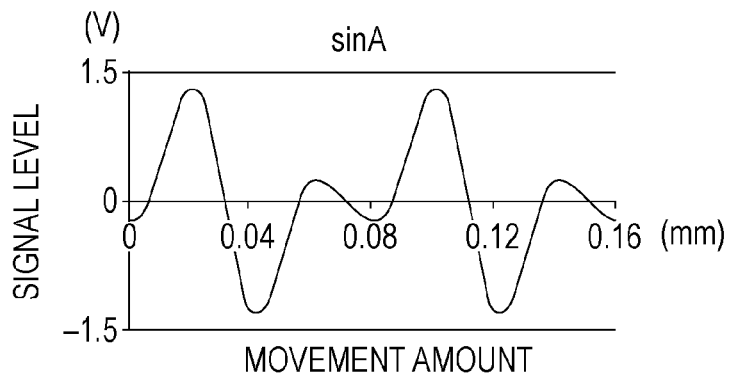
FIGS. 15A to 15D are diagrammatic views illustrating examples of changes in signal levels corresponding to a movement amount of an interference fringe where
Figure 15B:
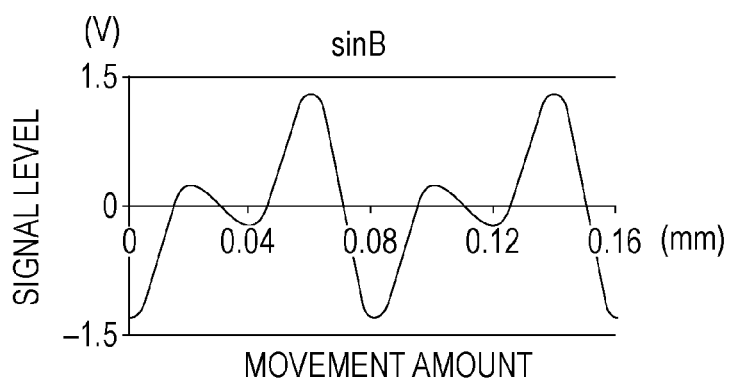
Figure 15C:
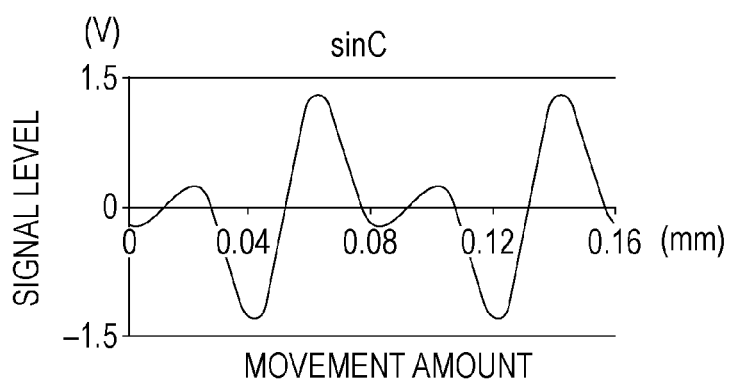
Figure 15D:
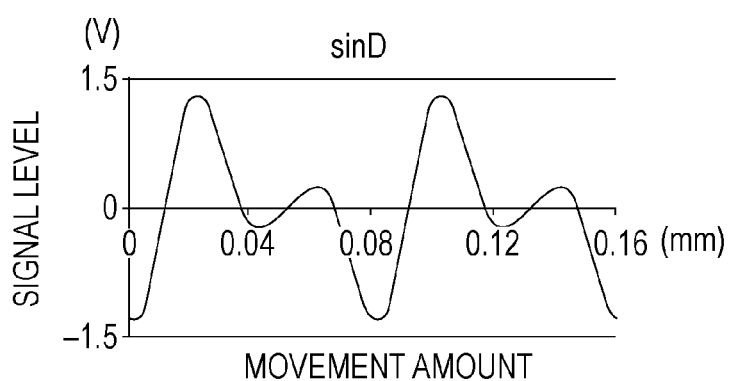
Figure 16A:
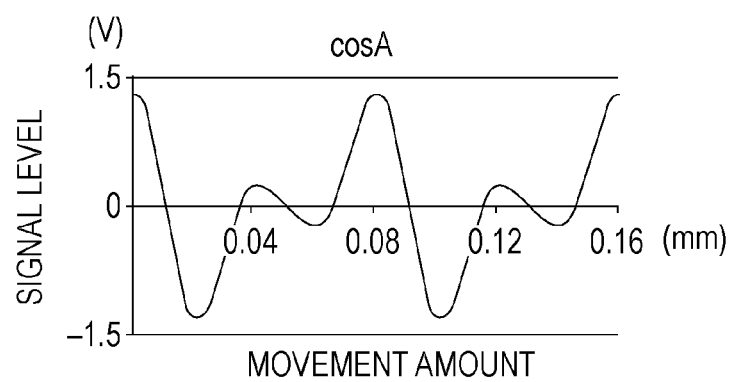
FIGS. 16A to 16D are diagrammatic views illustrating examples of changes in signal levels corresponding to a movement amount of an interference fringe where
Figure 16B:
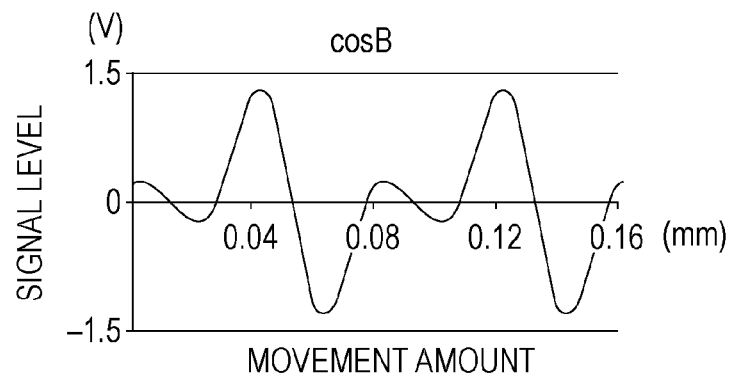
Figure 16C:
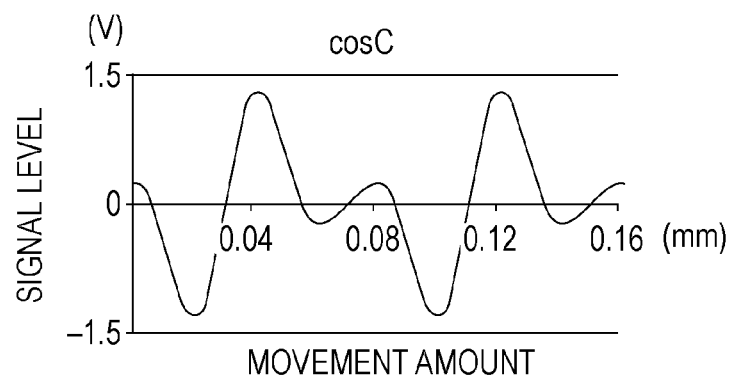
Figure 16D:
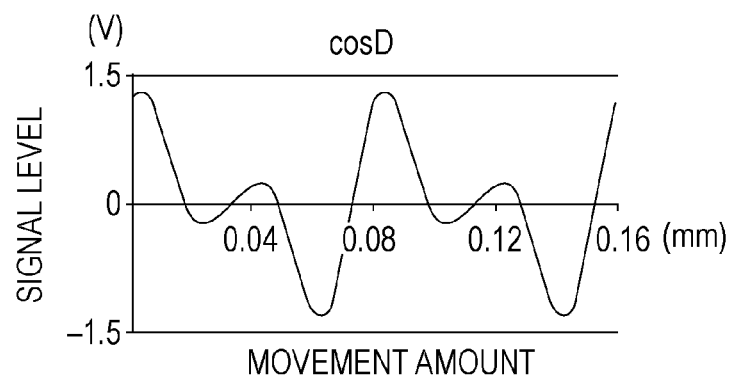

In the present embodiment, by causing the signals to be opposite in phase, the signal sin C (an example is illustrated in FIG. 15C) becomes a waveform line-symmetrical to the waveform of the signal sin A (an example is illustrated in FIG. 15A) with respect to an axis perpendicular to an axis corresponding to the movement amount. In addition, the signal sin D (an example is illustrated in FIG. 15D) becomes a waveform line-symmetrical to the waveform of the signal sin B (an example is illustrated in FIG. 15B) with respect to an axis perpendicular to an axis corresponding to the movement amount. Furthermore, the signal cos C (an example is illustrated in FIG. 16C) becomes a waveform line-symmetrical to the waveform of the signal cos A (an example is illustrated in FIG. 16A) with respect to an axis perpendicular to an axis corresponding to the movement amount. In addition, the signal cos D (an example is illustrated in FIG. 16D) becomes a waveform line-symmetrical to the waveform of the signal cos B (an example is illustrated in FIG. 16B) with respect to an axis perpendicular to an axis corresponding to the movement amount.

As illustrated in FIG. 6, the signals sin A, sin B, cos A, and cos B are input to the phase calculation unit 36. On the basis of the signals sin A, sin B, cos A, and cos B, the phase calculation unit 36 determines a phase at a position (for example, the position of a bright portion) of the interference fringe with a preliminarily set position as a reference, and outputs phase information θ. In addition, the phase information θ may also be calculated using the signals sin C, sin D, cos C, and cos D.

Figure 9:
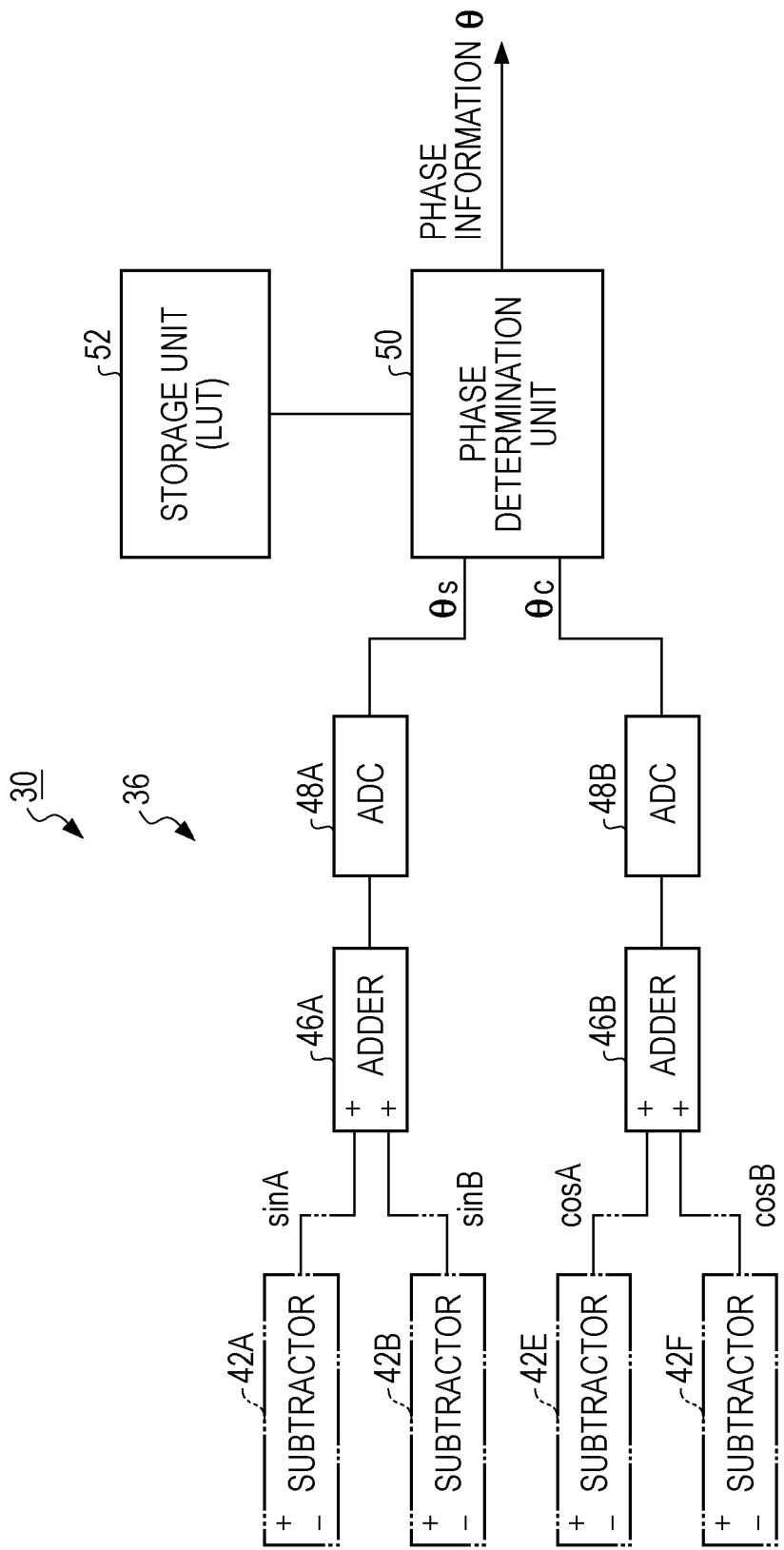
FIG. 9 is a functional block diagram illustrating an example of a phase calculation unit.

In the disclosed technology, the phase calculation unit 36 may also adopt any configuration where it may be possible to calculate the phase information θ of the interference fringe. FIG. 9 illustrates an example of the phase calculation unit 36 according to the present embodiment. The phase calculation unit 36 includes adders 46A and 46B, AD converters (ADCs) 48A and 48B, a phase determination unit 50, and a storage unit 52.

The adder 46A adds the signal sin A of the subtractor 42A and the signal sin B of the subtractor 42B. By converting the output signal of the adder 46A into a digital signal, the AD converter 48A outputs a predetermined signal (hereinafter, defined as a phase signal θs). The adder 46B adds the signal cos A of the subtractor 42E and the signal cos B of the subtractor 42F. By converting the output signal of the adder 46B into a digital signal, the AD converter 48B outputs a predetermined signal (hereinafter, defined as a phase signal θc). In addition, in the present embodiment, an analog signal the light receiving element 28 outputs may also be preliminarily converted into a digital signal, and in this case, the phase calculation unit 36 has a configuration where the AD converters 48A and 48B are omitted.

In the encoder 10, the phase information θ corresponding to the phase signal θs and the phase signal θc is preliminarily acquired, and a table (Look-Up Table: LUT) is preliminarily provided where the phase signal θs, the phase signal θc, and the corresponding phase information θ are associated with one another. This LUT is stored in the storage unit 52.

By referring to the LUT stored in the storage unit 52, the phase determination unit 50 reads and outputs the phase information θ corresponding to the phase signals θs and θc. In the present embodiment, the phase information θ may also be any information capable of determining which of ranges of 0 degrees to 90 degrees, 90 degrees to 180 degrees, 180 degrees to 270 degrees, and 270 degrees to 0 degrees (360 degrees) the phase (phase information θ) corresponding to the movement amount of the interference fringe corresponds to.

In the signal processing unit 30 illustrated in FIG. 6, the output signal selection unit 38 includes a first signal selection unit 54, a switching setting unit 56, and a second signal selection unit 58. The first signal selection unit 54 includes a selector 60A on the sine side and a selector 60B on the cosine side. The signals sin A, sin B, sin C, and sin D are input to the selector 60A, and the signals cos A, cos B, cos C, and cos D are input to the selector 60B. In addition, the phase information θ the phase calculation unit 36 outputs is input to each of the selectors 60A and 60B.

In response to the phase information θ, the selector 60A outputs the signals sin A and sin B, or the signals sin C and sin D. In addition, in response to the phase information θ, the selector 60B outputs the signals cos A and cos B, or the signals cos C and cos D.

FIG. 10 illustrates the combination of the output signal of the selector 60A on the sine side and the output signal of the selector 60B on the cosine side, which corresponds to the phase information θ in the disclosed technology.

In the output signal selection unit 38, in a range where the phase information θ corresponds to 0 degrees to 90 degrees or 270 degrees to 0 degrees (360 degrees), the selector 60A outputs the signal sin C and the signal sin D. In addition, in the output signal selection unit 38, in a range where the phase information θ corresponds to 90 degrees to 180 degrees or 180 degrees to 270 degrees (90 degrees to 270 degrees), the selector 60A outputs the signal sin A and the signal sin B.

In addition, in the output signal selection unit 38, in a range where the phase information θ corresponds to 0 degrees to 90 degrees or 90 degrees to 180 degrees (0 degrees to 180 degrees), the selector 60B outputs the signal cos A and the signal cos B. In addition, in the output signal selection unit 38, in a range where the phase information θ corresponds to 180 degrees to 270 degrees or 270 degrees to 0 degrees (180 degrees to 360 degrees), the selector 60B outputs the signal cos C and the signal cos D. In addition, in the case of the phase information θ=90 degrees or 270 degrees, the selector 60A outputs one of the pair of the signals sin A and sin B and the pair of the signals sin C and sin D, which is preliminarily set. In addition, in the case of the phase information θ=0 degrees or 180 degrees, the selector 60B outputs one of the pair of the signals cos A and cos B and the pair of the signals cos C and cos D, which is preliminarily set.

As illustrated in FIG. 6, the switching setting unit 56 in the output signal selection unit 38 includes absolute value extraction units 62A and 62B and a comparator 64A on the sine side and absolute value extraction units 62C and 62D and a comparator 64B on the cosine side.

By the signal sin A or signal sin C the selector 60A outputs being input, the absolute value extraction unit 62A outputs the absolute value of an input signal to the comparator 64A. By the signal sin B or signal sin D the selector 60A outputs being input, the absolute value extraction unit 62B outputs the absolute value of an input signal to the comparator 64A. The comparator 64A outputs a result of comparison between the output signal of the absolute value extraction unit 62A and the output signal of the absolute value extraction unit 62B.

By the signal cos A or signal cos C the selector 60B outputs being input, the absolute value extraction unit 62C outputs the absolute value of an input signal to the comparator 64B. By the signal cos B or signal cos D the selector 60B outputs being input, the absolute value extraction unit 62D outputs the absolute value of an input signal to the comparator 64B. The comparator 64B outputs a result of comparison between the output signal of the absolute value extraction unit 62C and the output signal of the absolute value extraction unit 62D.

The second signal selection unit 58 includes a selector 66A on the Sine side and a selector 66B on the Cosine side. The signal sin A and signal sin B or the signal sin C and signal sin D, output by the selector 60A, are input to the selector 66A, and a signal corresponding to the comparison result of the comparator 64A is input to the selector 66A.

When the selector 60A has output the signal sin A and the signal sin B, the comparator 64A causes the selector 66A to output, as the waveform signal Sin Q, a signal whose absolute value is larger and whose signal level is higher. In addition, when the selector 60A has output the signal sin C and the signal sin D, the comparator 64A causes the selector 66A to output, as the waveform signal Sin Q, a signal whose absolute value is larger and whose signal level is higher.

The signal cos A and signal cos B or the signal cos C and signal cos D, output by the selector 60B, are input to the selector 66B, and a signal corresponding to the comparison result of the comparator 64B is input to the selector 66B.

When the selector 60B has output the signal cos A and the signal cos B, the comparator 64B causes the selector 66B to output, as the waveform signal Cos Q, a signal whose absolute value is larger and whose signal level is higher. In addition, when the selector 60B has output the signal cos C and the signal cos D, the comparator 64B causes the selector 66B to output, as the waveform signal Cos Q, a signal whose absolute value is larger and whose signal level is higher.

On the basis of the waveform signal Sin Q and the waveform signal Cos Q output from the signal processing unit 30, the encoder 10 calculates the relative movement direction and the relative movement amount of the scale unit 14. In the present embodiment, the amounts of changes in the phases of the waveform signal Sin Q and the waveform signal Cos Q are converted into the movement amount of the interference fringe, and hence, the relative movement amount of the scale unit 14 is calculated.

Figure 11:
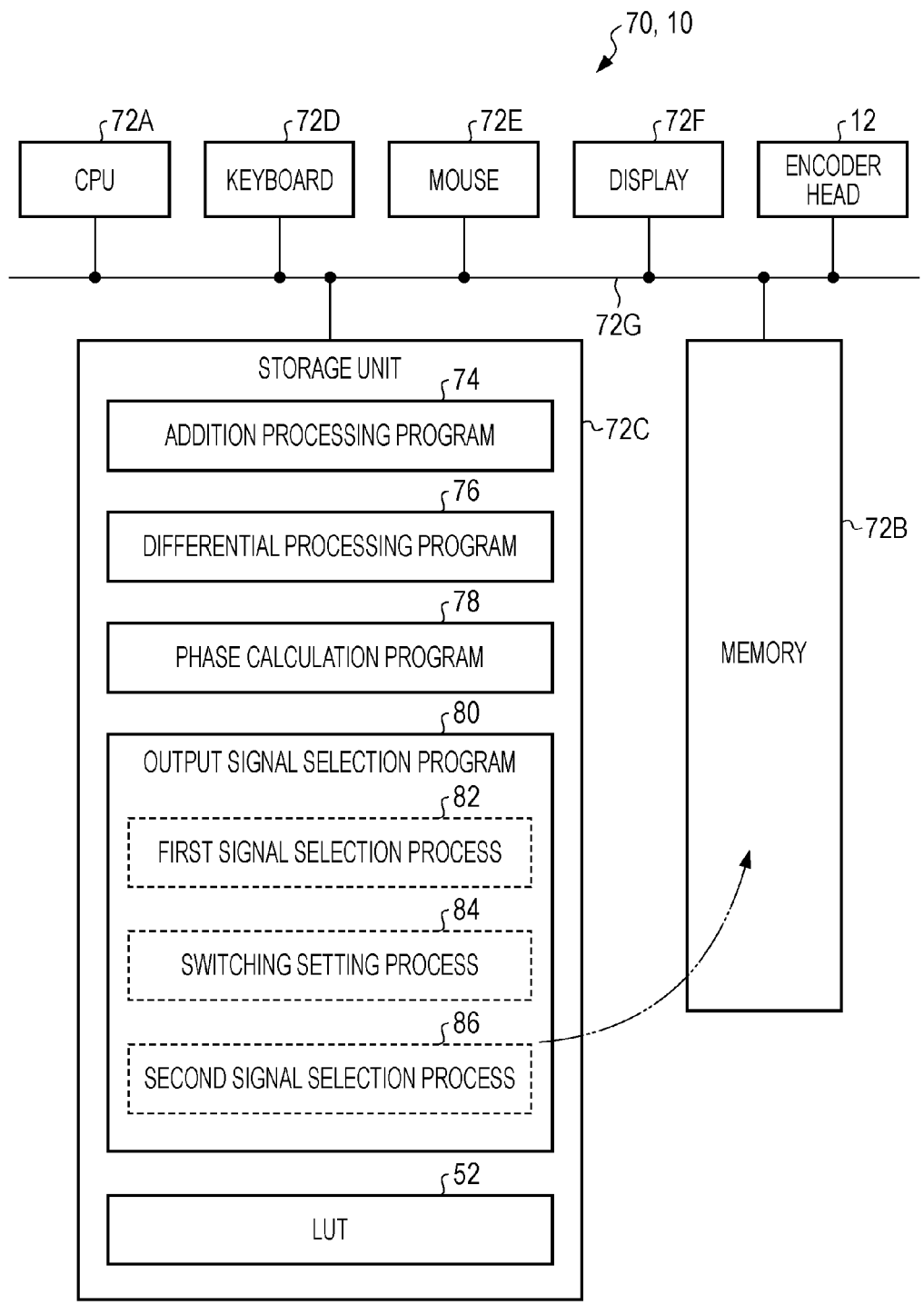
FIG. 11 is a functional block diagram of a computer functioning as an encoder.
Figure 13A:
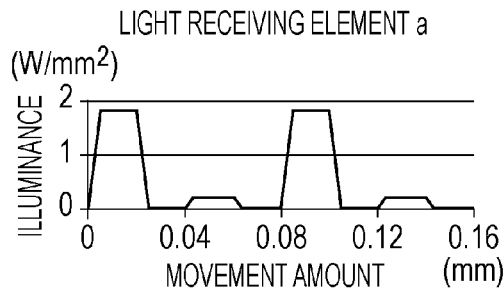
FIGS. 13A to 13H are diagrammatic views illustrating examples of changes in illuminance on individual eight light receiving elements, which occur owing to movement of an interference fringe.
Figure 13E:
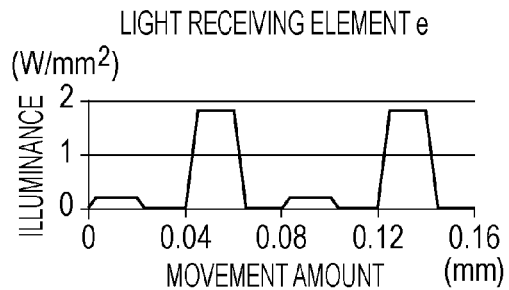
Figure 13B:
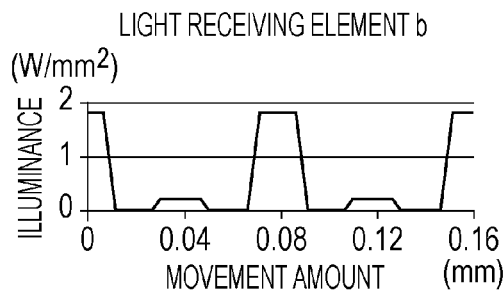
Figure 13F:
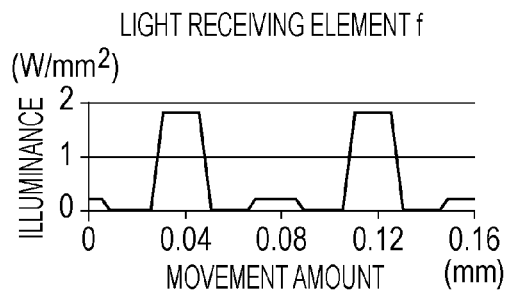
Figure 13C:
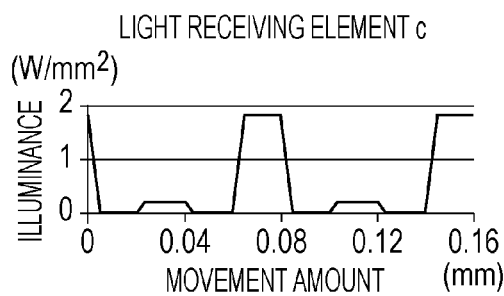
Figure 13G:
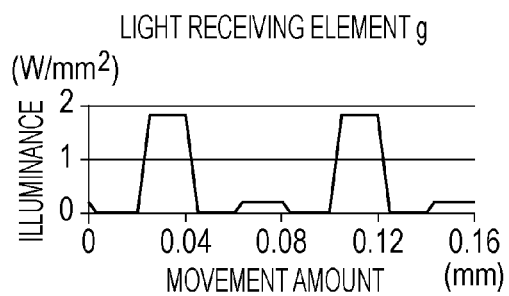
Figure 13D:
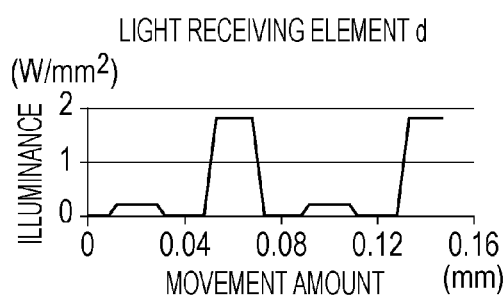
Figure 13H:
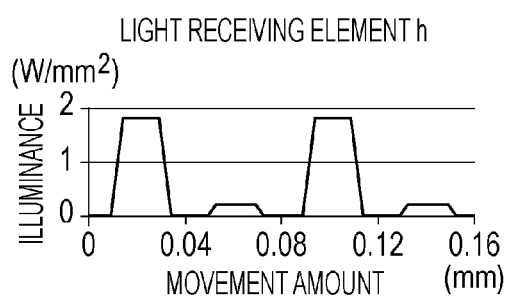

The encoder 10 may be realized using, for example, a computer 70 illustrated in FIG. 11. The computer 70 includes a CPU 72A, a memory 72B, a non-volatile storage unit 72C, a keyboard 72D, a mouse 72E, and a display 72F, which are connected to one another owing to a bus 72G. In addition, the encoder head 12 is connected to the computer 70. In addition, the encoder head 12 is connected to the bus 72G of the computer 70 through an input-output interface not illustrated.

The storage unit 72C in the computer 70 may be realized using a non-volatile storage medium such as a hard disk drive (HDD) or a flash memory. In the storage unit 72C, an addition processing program 74 used for causing the computer 70 to function as the addition processing unit 32 and a differential processing program 76 used for causing the computer 70 to function as the differential processing unit 34 are stored. In addition, in the storage unit 72C, a phase calculation program 78 used for causing the computer 70 to function as the phase calculation unit 36 and a signal selection program 80 used for causing the computer 70 to function as the output signal selection unit 38 are stored.

The CPU 72A reads and deploys the individual programs from the storage unit 72C to the memory 72B, and sequentially executes processes the individual programs 74 to 80 include. The CPU 72A operates as the addition processing unit 32 by executing the addition processing program 74, operates as the differential processing unit 34 by executing the differential processing program, and operates as the phase calculation unit 36 by executing the phase calculation program 76.

In addition, the output signal selection program 80 includes a first signal selection process 82, a switching setting process 84, and a second signal selection process 86. The CPU 72A operates as the first signal selection unit 54 by executing the first signal selection process 82, operates as the switching setting unit 56 by executing the switching setting process 84, and operates as the second signal selection unit 58 by executing the second signal selection process 86.

When the signal processing unit 30 in the encoder 10 is realized by the computer 70, the storage unit 72C may be used as the storage unit 52 storing therein the LUT.

In addition, it may be possible to realize the signal processing unit 30 in the encoder 10 using, for example, a semiconductor integrated circuit, in more detail, an Application Specific Integrated Circuit (ASIC) or the like.

Hereinafter, the function of the present embodiment will be described.

The encoder 10 radiates, to the scale unit 14, light the light source unit 16 provided in the encoder head 12 emits, and forms the interference fringe on the light receiving unit 18 in the encoder head 12 owing to the light reflected by the diffraction grating 20 in the scale unit 14. At this time, in the encoder 10, the duty ratio Dr of the reflection portion 22 formed in the diffraction grating 20 is set on the basis of the degree m of the interference fringe.

In the encoder 10, the duty ratio Dr of the diffraction grating 20 is caused to satisfy the duty ratio Dr=75%, and the interference fringe illustrated in FIG. 4 is caused to be formed on the light receiving unit 18 in the encoder head 12. Accordingly, in the encoder 10, as the interference fringe of the fourth degree, a fringe where a bright portion whose reduction of illuminance is suppressed emerges every one period of the interference fringe turns out to be formed on the light receiving unit 18.

FIG. 12 illustrates the flow of signal processing used for outputting the waveform signal Sin Q and the waveform signal Cos Q in the signal processing unit 30 in the encoder 10.

In the encoder 10, in an initial step 100, the signals $a_1$, $a_2$, $b_1$, ..., $g_2$, $h_1$, and $h_2$ of the light receiving elements 28*a* to 28*h* in the sensor arrays 28A and 28B corresponding to two periods of the interference fringe.

FIGS. 13A to 13H illustrate changes in illuminance on the light receiving elements 28*a* to 28*h* in the light receiving unit 18, associated with the movement of the interference fringe. In FIG. 13, the light receiving element 28*a* to light receiving element 28*h* are expressed as light receiving elements a to h, and FIG. 13A to FIG. 13H corresponds to the light receiving element 28*a* to 28*h*, respectively. In addition, in FIG. 13A to FIG. 13H, a horizontal axis is the movement amount of the interference fringe, and the movement amount of the interference fringe corresponds to the relative movement amount of the scale unit 14.

Two sets of the light receiving elements 28a to 28h output the signals $a_1$, $a_2$, $b_1$, ..., $g_2$, $h_1$, and $h_2$ of signal levels (voltages) corresponding to illuminance. The encoder 10 reads the signals $a_1$, $a_2$, $b_1$, ..., $g_2$, $h_1$, and $h_2$.

As illustrated in FIG. 12, in a subsequent step 102, the encoder 10 adds the signals $a_1$, $a_2$, $b_1$, ..., $g_2$, $h_1$, and $h_2$ read from the two sets of the light receiving elements 28a to 28h. In other words, by adding the signals $a_2$ to $h_2$ of one subsequent set of the light receiving elements 28a to 28h to the signals $a_1$ to $h_1$ of one set of the light receiving elements 28a to 28h, the signals a to h are output.

In FIG. 14A to FIG. 14H, the signals a to h the adders 40A to 40H output are illustrated. In addition, in FIG. 14A to FIG. 14H, the adders 40A to adder 40H are expressed as an adder A to an adder H, and FIG. 14A to FIG. 14H correspond to the adders 40A to 40H, respectively. In addition, in FIG. 14A to FIG. 14H, a vertical axis indicates illuminance corresponding to a signal level.

As illustrated in FIG. 13A to FIG. 13H and FIG. 14A to FIG. 14H, the signal a the adder 40A outputs becomes a signal of illuminance obtained by adding illuminance the two light receiving elements 28a receive. In addition, the signals b to h the adders 40B to 40H output become signals corresponding to illuminance the light receiving elements b to h receive two by two.

In a step 104 in FIG. 12, with respect to the output signals a to h, differential processing is performed so as to correspond to the sensor arrays 28A and 28B (expressed as arrays A and B in FIG. 12 and the same shall apply hereinafter), and the signals sin A, sin B, cos A, and cos B are calculated from the sensor arrays 28A and 28B. In addition, in a step 106, by differential processing being performed so as to correspond to the sensor arrays 28C and 28D set on the sensor arrays 26A and 26B, the signals sin C, sin D, cos C, and cos D are calculated owing to the combination of the sensor arrays 28C and 28D. In the present embodiment, a method of the related art may be applied to the differential processing.

In FIG. 15A to FIG. 15D, the signals sin A to sin D the subtractors 42A to 42D on the sine side output are illustrated. In addition, in FIG. 16A to FIG. 16D, the signals cos A to cos D the subtractors 42E to 42H on the cosine side output are illustrated. The signals cos A to cos D the subtractors 42E to 42H output become waveforms out of phase with the signals sin A to sin D the subtractors 42A to 42D output by 180 degrees.

Figure 14A:
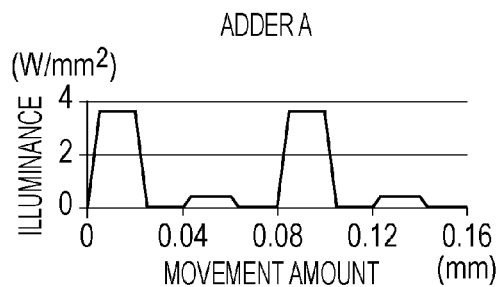
FIGS. 14A to 14H are diagrammatic views illustrating examples of changes in illuminance corresponding to signals obtained in individual eight light receiving elements owing to movement of an interference fringe.
Figure 14E:
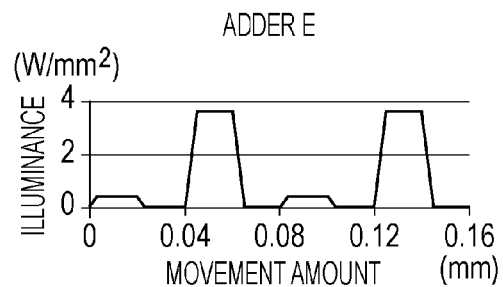

The signal sin A illustrated in FIG. 15A becomes a signal obtained by subtracting the signal c (refer to FIG. 14C) at a position out of phase with the signal a by 180 degrees, from the signal a (refer to FIG. 14A). In addition, the signal sin B illustrated in FIG. 15B becomes a signal obtained by subtracting the signal g (refer to FIG. 14G) at a position out of phase with the signal e by 180 degrees, from the signal e (refer to FIG. 14E).

On the other hand, the signal sin C illustrated in FIG. 15C becomes a signal obtained by subtracting the signal e at a position out of phase with the signal c by 180 degrees, from the signal c and further inverting the subtraction result. In addition, the signal sin D illustrated in FIG. 15D becomes a signal obtained by subtracting the signal a at a position out of phase with the signal g by 180 degrees, from the signal g and further inverting the subtraction result.

Here, the waveform of a change in the signal level (hereinafter, simply referred to as a waveform) of the signal sin B becomes the waveform of a signal out of phase with the signal sin A by a phase corresponding to one period of the interference fringe. In addition, the waveform of the signal sin D is the waveform of a signal out of phase with the signal sin C by a phase corresponding to one period of the interference fringe.

In addition, the signals sin C and sin D are signals obtained from the sensor arrays 26C and 26D out of phase with the sensor arrays 26A and 26B by 180 degrees with respect to a phase on the interference fringe. In addition, the signs of the subtractors 42C and 42D are inverted by the inverters 44.

Figure 14B:
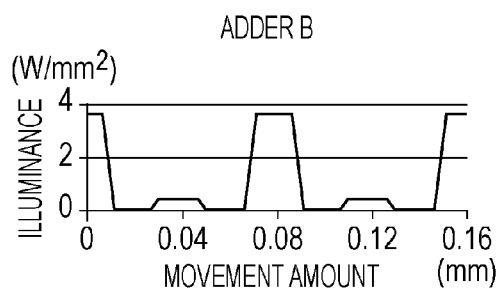
Figure 14F:
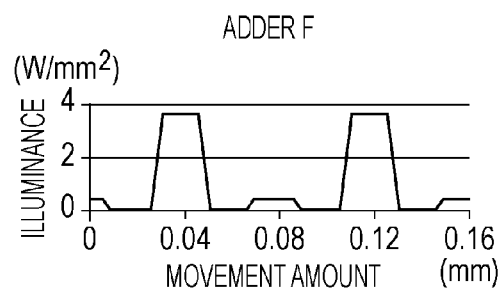
Figure 14C:
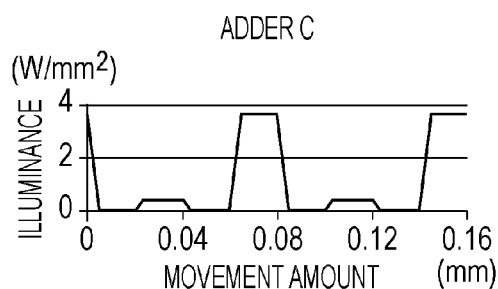
Figure 14G:
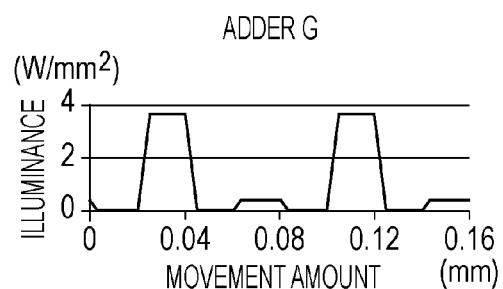
Figure 14D:
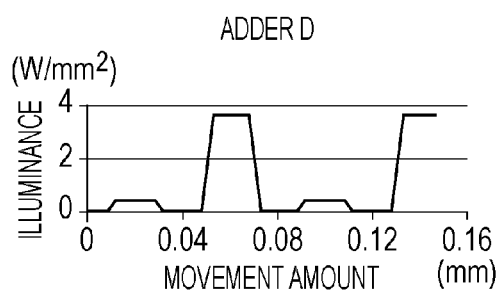
Figure 14H:
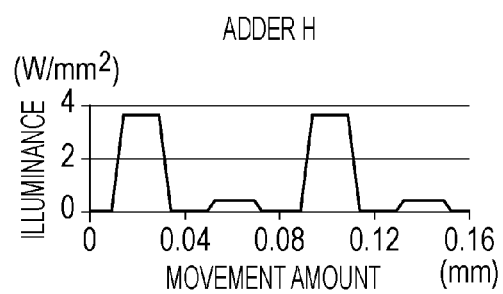

The signal cos A illustrated in FIG. 16A is a signal obtained by subtracting the signal d (refer to FIG. 14D) at a position out of phase with the signal b by 180 degrees, from the signal b (refer to FIG. 14B). In addition, the signal cos B illustrated in FIG. 16B is a signal obtained by subtracting the signal h (refer to FIG. 14H) at a position out of phase with the signal f by 180 degrees, from the signal f (refer to FIG. 14F).

Furthermore, the signal cos C illustrated in FIG. 16C is a signal obtained by subtracting the signal f at a position out of phase with the signal d by 180 degrees, from the signal d and inverting the subtraction result. In addition, the signal cos D illustrated in FIG. 16D is a signal obtained by subtracting the signal b at a position out of phase with the signal h by 180 degrees, from the signal h and inverting the subtraction result.

Accordingly, the waveform of the signal sin C becomes a waveform line-symmetrical to the waveform of the signal sin A with respect to an axis perpendicular to an axis corresponding to the movement amount, and the waveform of the signal sin D becomes a waveform line-symmetrical to the waveform of the signal sin B with respect to an axis perpendicular to the axis corresponding to the movement amount. In addition, the waveform of the signal cos C becomes a waveform line-symmetrical to the waveform of the signal cos A with respect to an axis perpendicular to the axis corresponding to the movement amount, and the waveform of the signal cos D becomes a waveform line-symmetrical to the waveform of the signal cos B with respect to an axis perpendicular to the axis corresponding to the movement amount.

In a step 108 in FIG. 12, the phase information θ of the signals sin A, sin B, cos A, and cos B obtained from the combination of the sensor arrays 28A and 28B are calculated. The phase information θ becomes, for example, information indicating the phase of the interference fringe whose original point corresponds to sin A+sin B=0.

The phase calculation unit 36 adds the signal sin A and the signal sin B to calculate the phase signal θs (sin A+sin B=θs), and adds the signal cos A and the signal cos B to calculate the phase signal θc (cos A+cos B=θc).

Figure 17A:
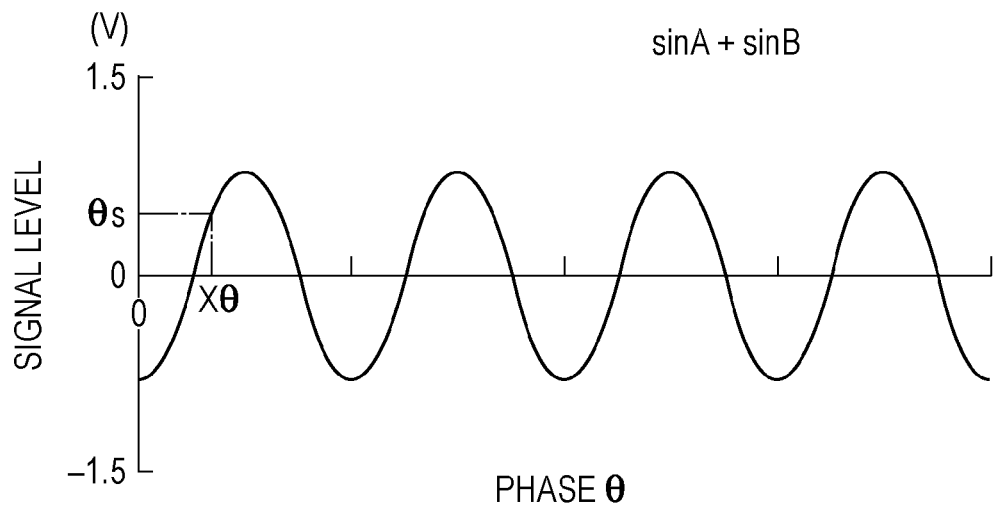
FIG. 17A is a diagrammatic view illustrating a waveform on a sine side obtained by adding a signal sin A and a signal sin B.
Figure 17B:
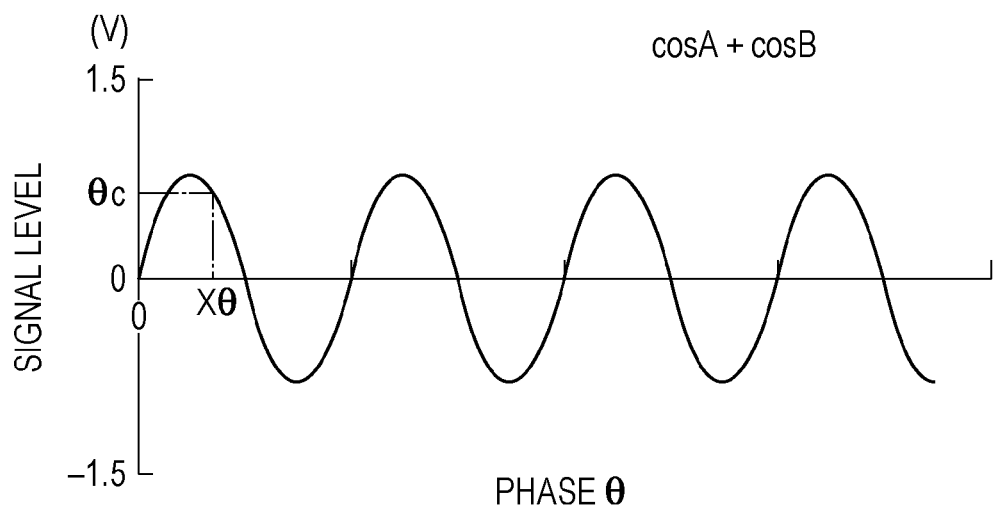
FIG. 17B is a diagrammatic view illustrating a waveform on a cosine side obtained by adding a signal cos A and a signal cos B.

FIG. 17A illustrates a change in a signal level obtained by adding the signal sin A (refer to FIG. 15A) and the signal sin B (refer to FIG. 15B). In addition, FIG. 17B illustrates a change in a signal level obtained by adding the signal cos A (refer to FIG. 16A) and the signal cos B (refer to FIG. 16B) in the same way.

As illustrated in FIG. 17A, when light and dark change with two periods of the interference fringe, a sine waveform (sin waveform) is obtained by adding the signals sin A and sin B having a phase difference of 360 degrees. In addition, as illustrated in FIG. 17B, a cosine waveform (cos waveform) is obtained by adding the signals cos A and cos B having a phase difference of 360 degrees.

In FIG. 17A, a signal level corresponding to a point xθ obtained by converting the phase information θ into the movement amount is the phase signal θs. In addition, in FIG. 17B, a signal level corresponding to the point xθ is the phase signal θc. With reference to the LUT stored in the storage unit 52, the encoder 10 reads the phase information θ corresponding to the phase signals θs and θc.

In a step 110 in FIG. 12, on the basis of the phase information θ, one of the combination of the signal sin A and the signal sin C and the combination of the signal sin B and the signal sin D is selected. In addition, in a step 112, on the basis of the phase information θ, one of the combination of the signal cos A and the signal cos C and the combination of the signal cos B and the signal cos D is selected. At this time, in the encoder 10, as illustrated in FIG. 10, in a range where the phase information θ corresponds to 0 degrees to 90 degrees or 270 degrees to 0 degrees (360 degrees), the signals sin C and sin D and the signals cos C and cos D are output. In addition, in a range where the phase information θ corresponds to 90 degrees to 270 degrees (90 degrees to 180 degrees or 180 degrees to 270 degrees), the signals sin A and sin B and the signals cos A and cos B are output.

In FIG. 12, in a subsequent step 114, the absolute values of the signal sin A and the signal sin B or the absolute values of the signal sin C and the signal sin D are compared with each other. In addition, in a step 116, the absolute values of the signal cos A and the signal cos B or the absolute values of the signal cos C and the signal cos D are compared with each other. In other words, when the signals sin A and sin B and the signals cos A and cos B are selected, the absolute values of the signal sin A and the signal sin B are compared with each other, and the absolute values of the signal cos A and the signal cos B are compared with each other. In addition, when the signals sin C and sin D and the signals cos C and cos D are selected, the absolute values of the signal sin C and the signal sin D are compared with each other, and the absolute values of the signal cos C and the signal cos D are compared with each other.

In a subsequent step 118, on the basis of a result of comparison between the signal sin A and the signal sin B or between the signal sin C and the signal sin D, a signal whose absolute value is larger is output as the waveform signal Sin Q. In addition, in a step 120, on the basis of a result of comparison between the signal cos A and the signal cos B or between the signal cos C and the signal cos D, a signal whose absolute value is larger is output as the waveform signal Cos Q.

In FIG. 18A, the signals sin A, sin B, sin C, and sin D (refer to FIG. 15A to FIG. 15D) are illustrated with being overlapped with one another, and in FIG. 18B, the waveform signal Sin Q output from the signal processing unit 30 is illustrated. In addition, in FIG. 19A, the signals cos A, cos B, cos C, and cos D (refer to FIG. 16A to FIG. 16D) are illustrated with being overlapped with one another, and in FIG. 19B, the waveform signal Cos Q output from the signal processing unit 30 is illustrated. In addition, in FIG. 18A, FIG. 18B, FIG. 19A, and FIG. 19B, a horizontal axis indicates the phase θ of the interference fringe. This phase θ changes form 0 degrees to 360 degrees, and hence, the movement amount of the interference fringe turns out to correspond to one period of the formation position on the light receiving unit 18.

When it is assumed that a point satisfying sin A+sin B=0 corresponds to θ=0 degrees, the signals sin C and sin D zero-cross at θ=0 degrees or 360 degrees (0 degrees in a second period), and the signals sin A and sin B zero-cross at θ=180 degrees or 540 degrees (180 degrees in the second period) (refer to FIG. 18A). In addition, at θ=90 degrees or 270 degrees, sin A=sin C and sin B=sin D are satisfied.

Figure 19A:
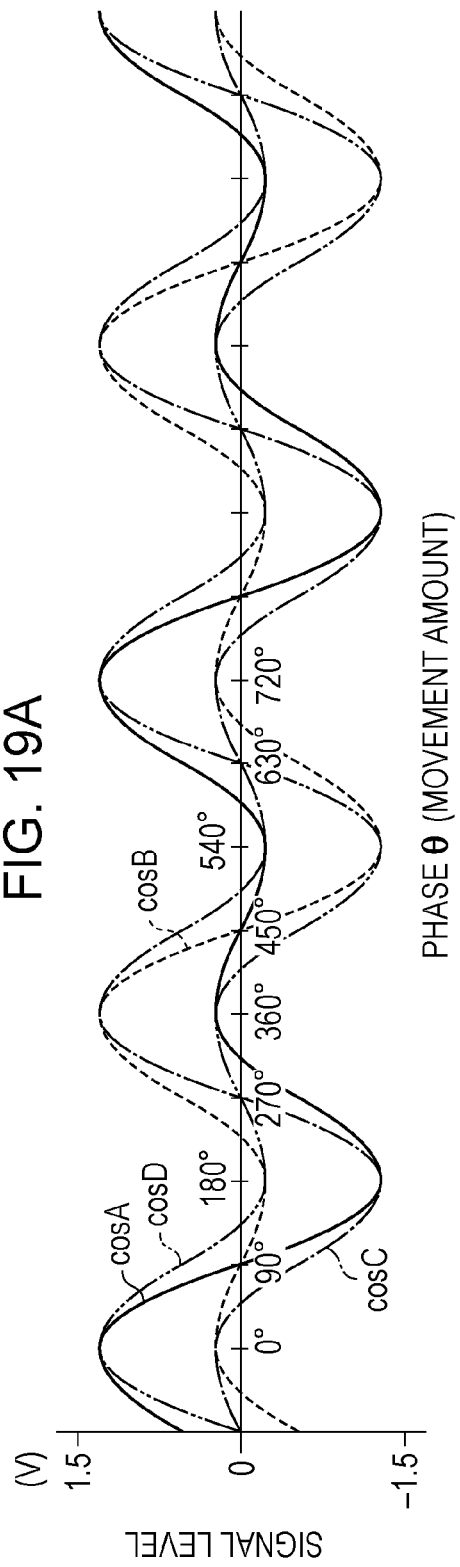
FIG. 19A is a diagrammatic view illustrating examples of changes in signal levels of signals cos A, cos B, cos C, and cos D corresponding to a phase of an interference fringe.

In addition, as illustrated in FIG. 19A, the signals cos A and cos B zero-cross at θ=90 degrees or 450 degrees (90 degrees in the second period), and the signals cos C and cos D zero-cross at θ=270 degrees or 630 degrees (270 degrees in the second period). In addition, at θ=0 degrees or 180 degrees, cos A=cos C and cos B=cos D are satisfied.

From here, in the encoder 10, at the phase θ=0 degrees, 90 degrees, 180 degrees, or 270 degrees, switching between the signals sin A to sin D and switching between the signals cos A to cos D are performed.

Accordingly, as illustrated in FIG. 18B, the waveform signal Sin Q becomes the signal sin D from among the signals sin C and sin D in a range where the phase θ is from 0 degrees to 90 degrees, and becomes the signal sin A from among the signals sin A and sin B in a range where the phase θ is from 90 degrees to 180 degrees. In addition, the waveform signal Sin Q becomes the signal sin A from among the signals sin A and sin B in a range where the phase θ is from 180 degrees to 270 degrees, and becomes the signal sin C from among the signals sin C and sin D in a range where the phase θ is from 270 degrees to 360 degrees.

Furthermore, in the subsequent period of the interference fringe, the waveform signal Sin Q becomes the signal sin C from among the signals sin C and sin D in a range where the phase θ is from 0 degrees to 90 degrees (from 360 degrees to 450 degrees). In addition, the waveform signal Sin Q becomes the signal sin B from among the signals sin A and sin B in a range where the phase θ is from 90 degrees to 180 degrees (from 450 degrees to 540 degrees). The waveform signal Sin Q becomes the signal sin B from among the signals sin A and sin B in a range where the phase θ is from 180 degrees to 270 degrees (from 540 degrees to 630 degrees), and becomes the signal sin D from among the signals sin C and sin D in a range where the phase θ is from 270 degrees to 0 degrees (from 630 degrees to 720 degrees).

Figure 19B:
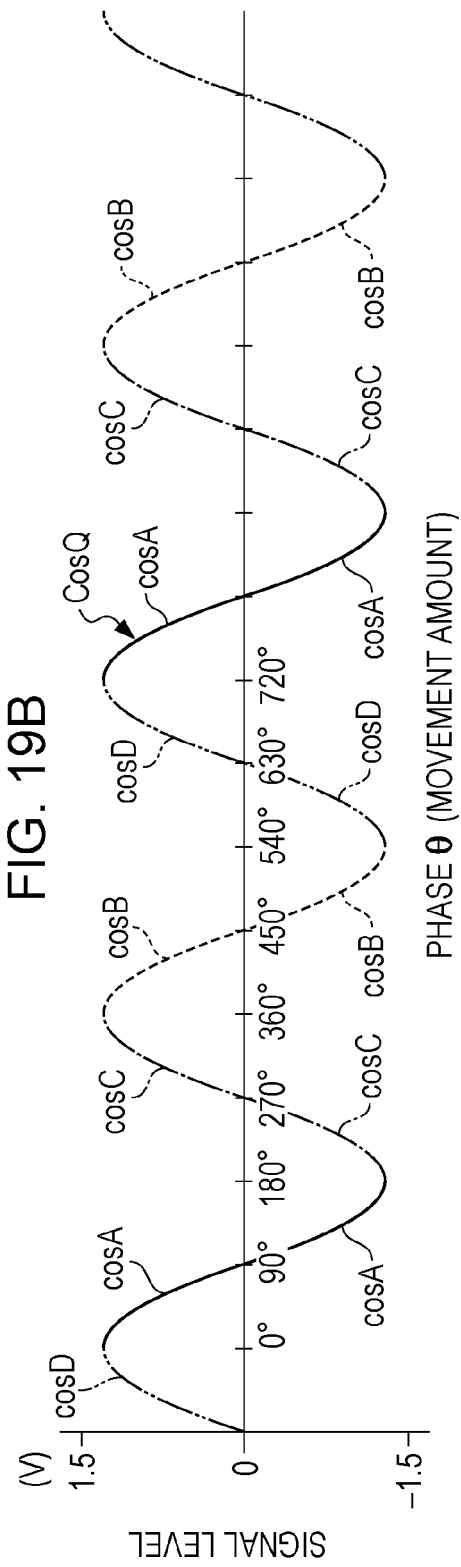
FIG. 19B is a diagrammatic view illustrating an example of a waveform signal obtained from FIG. 19A.

In addition, as illustrated in FIG. 19B, the waveform signal Cos Q becomes the signal cos A from among the signals cos A and cos B in a range where the phase θ is from 0 degrees to 90 degrees, and becomes the signal cos B from among the signals cos A and cos B in a range where the phase θ is from 90 degrees to 180 degrees. In addition, the waveform signal Cos Q becomes the signal cos C from among the signals cos C and cos D in a range where the phase θ is from 180 degrees to 270 degrees, and becomes the signal cos C from among the signals cos C and cos D in a range where the phase θ is from 270 degrees to 360 degrees.

Furthermore, in the subsequent period of the interference fringe, the waveform signal Cos Q becomes the signal cos B from among the signals cos A and cos B in a range where the phase θ is from 0 degrees to 90 degrees (from 360 degrees to 450 degrees). In addition, the waveform signal Cos Q becomes the signal cos B from among the signals cos A and cos B in a range where the phase θ is from 90 degrees to 180 degrees (from 450 degrees to 540 degrees). The waveform signal Cos Q becomes the signal cos D from among the signals cos C and cos D in a range where the phase θ is from 180 degrees to 270 degrees (from 540 degrees to 630 degrees), and becomes the signal cos D from among the signals cos C and cos D in a range where the phase θ is from 270 degrees to 0 degrees (from 630 degrees to 720 degrees).

In the present embodiment, switching of signals to be selected is performed between the signals sin A to sin D and between the signals cos A to cos D at the phases θ related to each other, and hence the continuities of the waveform signals Sin Q and Cos Q may not be deteriorated.

When, by performing the differential processing on a signal corresponding to two periods of the interference fringe where one period of the light-dark change occurs with two periods of the interference fringe, one sine waveform and one cosine waveform are generated, obtained waveforms become a waveform illustrated in FIG. 15A and a waveform illustrated in FIG. 16A. In this case, since the waveforms do not become the sine waveform and the cosine waveform, it may be difficult to form the Lissajous figure, and it may become difficult to detect the relative movement amount of the scale unit.

On the other hand, by adding the signal sin A (refer to FIG. 15A) and the signal sin B (refer to FIG. 15B), obtained from the sensor arrays 28A and 28B, the sin waveform is obtained. In addition, by adding the signal cos A (refer to FIG. 16A) and the signal cos B (refer to FIG. 16B), obtained from the sensor arrays 28A and 28B, the cosine waveform is obtained. In this case, the sine waveform becomes a waveform illustrated in FIG. 17A, and the cosine waveform becomes a waveform illustrated in FIG. 17B. In addition, when the signals sin C and sin D obtained from the sensor arrays 26C and 26D are added and when the signals cos C and cos D are added, the same waveforms are also obtained.

While the sine waveform and the cosine waveform, obtained in such a way, may be used for acquiring the phase information θ of the interference fringe, since a noise component is superimposed, an S/N ratio is deteriorated.

On the other hand, in the present embodiment, the signals sin A and sin B and the signals cos A and cos B are obtained from the sensor arrays 26A and 26B, and the signals sin C and sin D and the signals cos C and cos D are obtained from the sensor arrays 26C and 26D. In addition, in the present embodiment, one of a signal obtained from the sensor arrays 26A and 26B and a signal obtained from the sensor arrays 26C and 26D is selected on the basis of the phase information θ.

In the present embodiment, when one period of the light-dark change is formed with two periods of the interference fringe, the signals sin A and sin B and the signals cos A and cos B, which correspond to the illuminance of two periods of the interference fringe, are obtained with the sensor arrays 26A and 26B as one set. In addition, in the present embodiment, using, as one set of the sensor arrays 26C and 26D, the sensor arrays 26A and 26B displaced by a half of the period of the interference fringe on the sensor arrays 26A and 26B, the signals sin C and sin D and the signals cos C and cos D are obtained.

In addition, in the present embodiment, by combining waveforms selected from the signals sin A to sin D on the basis of the phase information θ of the interference fringe, the waveform signal Sin Q is output, and by combining waveforms selected from the signals cos A to cos D on the basis of the phase information θ of the interference fringe, the waveform signal Cos Q is output.

In this way, in the present embodiment, signals whose signal levels are large are selected, and the waveform signal Sin Q and the waveform signal Cos Q are obtained. Therefore, the waveform signals Sin Q and Cos Q have high signal levels and noise components are hardly superimposed.

Accordingly, in the present embodiment, it may be possible to obtain the waveform signal Sin Q and the waveform signal Cos Q whose signal levels are high and whose S/N ratios are large. Using such a waveform signal Sin Q and a waveform signal Cos Q, when the Lissajous circle is formed, it may be possible to enlarge the Lissajous circle and bring the Lissajous circle to a true circle.

Accordingly, it may be possible for the encoder 10 according to the present embodiment to measure the movement amount of the relative movement of the scale unit 14 with a high degree of accuracy, owing to the encoder head 12. In addition, the duty ratio Dr of the reflection portion 22 is set to 75%, and hence, the resolution capability of the encoder 10 becomes high compared with the case of the duty ratio Dr=50% commonly used, illustrated in FIG. 5A.

In addition, since, in the encoder 10 according to the present embodiment, by causing the duty ratio Dr of the reflection portion 22 to be high, it may be possible to cause the illuminance of the bright portion in the interference fringe to be high, when illuminance equivalent to the case of the duty ratio Dr=50% is obtained, it may be possible to reduce the intensity of the light the light source unit 16 emits. In addition, in the encoder 10 according to the present embodiment, even if the scale pitch P of the diffraction grating 20 is narrowed, it may be possible to suppress the reduction of the illuminance of the interference fringe by causing the duty ratio Dr of the reflection portion 22 to be high. Accordingly, in the encoder 10 according to the present embodiment, it may be possible to achieve the suppression of the electric power consumption of the light source unit 16 and the long life-span of the light emitting element without reducing the resolution capability.

The disclosed technology is not limited to the rectilinear relative movement of the scale unit 14, and also includes that a cylindrically shaped or circular cylindrical shaped scale unit is used, a diffraction grating is formed in the inner surface of a cylinder hollow or the outer surface of a circular cylinder, and the movement direction and the relative movement amount of the interference fringe is detected as the rotation direction and the rotational angle of the scale unit.

Furthermore, all the patent applications described in the present application and technical documents disclosed in the patent applications are incorporated into the present application by reference at the same level as a case where it is specifically and individually described that individual documents, patent applications, and technical standards are incorporated by reference.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A displacement measurement device comprising:
a light receiving unit including a plurality of light receiving elements each of which outputs a signal corresponding to illuminance of interference fringe, the plurality of light receiving elements being arranged in a range of two periods of the interference fringe and being arranged with an interval based on the period of the interference fringe in a movement direction of the interference fringe, a degree of the interference fringe being a second degree or higher, the interference fringe being so that illuminance of a bright portion of the interference fringe switches alternately and formation position of the interference fringe moves in response to a displacement;
a differential processing unit configured to perform differential processing on predetermined combinations of the signals output from the plurality of light receiving elements to generate four signals, phases or waveforms of the four signals being different from one another;
a phase calculation unit configured to calculate a phase of the interference fringe on the basis of the signals output from the plurality of light receiving elements; and
an output signal selection unit configured to select two signals from among the four signals on the basis of the phase of the interference fringe and select, as an output signal corresponding to the displacement, a signal of which absolute value is larger from among the two selected signals.

2. The displacement measurement device according to claim 1, further comprising:
a diffraction grating where a ratio of a width of a reflection surface to a scale pitch is greater than or equal to 50%.

3. The displacement measurement device according to claim 1,
wherein the differential processing unit generates two pairs of the signals, each pair of which is due to two signals having a phase difference corresponding to one period of the interference fringe, among waveforms the four signals individually form, and
the output signal selection unit includes a first selection unit configured to select one of the two pairs on the basis of phase information of the interference fringe and a second selection unit configured to select, as the output signal, a signal whose absolute value is larger from among the signals of the selected pair.

4. The displacement measurement device according to claim 3,
wherein a waveform signals of the other pair form is a waveform line-symmetrical to a waveform the signals of the one pair of the two pairs form with respect to an axis perpendicular to an axis corresponding to a displacement amount.

5. The displacement measurement device according to claim 1,
wherein when an output signal of a first phase and an output signal of a second phase, which have a predetermined phase difference, are output as output signals corresponding to the displacement,
the differential processing unit generates the four signals with respect to the first phase and generates the four signals with respect to the second phase, and
the output signal selection unit selects a signal serving as the output signal of the first phase from among the four signals with respect to the first phase and selects a signal serving as the output signal of the second phase from among the four signals with respect to the second phase.

6. A displacement measurement method comprising:
receiving signals from a plurality of light receiving elements, the signals being corresponding to illuminance of interference fringe, the plurality of light receiving elements being arranged in a range of two periods of the interference fringe and being arranged with an interval based on the period of the interference fringe in a movement direction of the interference fringe, a degree of the interference fringe being a second degree or higher, the interference fringe being so that illuminance of a bright portion of the interference fringe switches alternately and formation position of the interference fringe moves in response to a displacement;
performing a differential processing on predetermined combinations of the signals output from the plurality of light receiving elements to generate four signals, phases or waveforms of the four signals being different from one another;
calculating a phase of the interference fringe on the basis of the signals output from the plurality of light receiving elements; and
selecting two signals from among the four signals on the basis of the phase of the interference fringe and select, as an output signal corresponding to the displacement, a signal of which absolute value is larger from among the two selected signals.

7. A non-transitory computer-readable storage medium storing a program causing a computer to execute a procedure, the procedure comprising:
receiving signals from a plurality of light receiving elements, the signals being corresponding to illuminance of interference fringe, the plurality of light receiving elements being arranged in a range of two periods of the interference fringe and being arranged with an interval based on the period of the interference fringe in a movement direction of the interference fringe, a degree of the interference fringe being a second degree or higher, the interference fringe being so that illuminance of a bright portion of the interference fringe switches alternately and formation position of the interference fringe moves in response to a displacement;
performing a differential processing on predetermined combinations of the signals output from the plurality of light receiving elements to generate four signals, phases or waveforms of the four signals being different from one another;
calculating a phase of the interference fringe on the basis of the signals output from the plurality of light receiving elements; and
selecting two signals from among the four signals on the basis of the phase of the interference fringe and select, as an output signal corresponding to the displacement, a signal of which absolute value is larger from among the two selected signals.

* * * * *